US007346858B1

(12) United States Patent
Berg et al.

(10) Patent No.: US 7,346,858 B1
(45) Date of Patent: Mar. 18, 2008

(54) COMPUTER HIERARCHICAL DISPLAY OF MULTIPLE DATA CHARACTERISTICS

(75) Inventors: Peter R. Berg, Glendora, CA (US); Andrew J. Bradley, Palo Alto, CA (US); Jeffrey B. Burton, Woodside, CA (US); James H. Cooley, Sunnyvale, CA (US); Donald J. Hoffman, Mountain View, CA (US); Susan J. Maruyama, Burlingame, CA (US); Kenneth J. Winchester, Paso Robles, CA (US)

(73) Assignee: The Hive Group, Richardson, TX (US)

( * ) Notice: Subject to any disclaimer, the term of this patent is extended or adjusted under 35 U.S.C. 154(b) by 0 days.

(21) Appl. No.: 09/713,843

(22) Filed: Nov. 15, 2000

Related U.S. Application Data

(60) Provisional application No. 60/220,417, filed on Jul. 24, 2000.

(51) Int. Cl.
G06F 3/01 (2006.01)
G06F 3/048 (2006.01)
G06F 17/30 (2006.01)
G06F 15/16 (2006.01)

(52) U.S. Cl. ............... 715/853; 715/708; 715/738; 715/744; 715/747; 715/810; 715/854; 715/528; 705/27

(58) Field of Classification Search ............ 705/27; 345/968, 962, 853; 707/6; 715/708, 738, 715/744, 747, 810, 853, 854, 528
See application file for complete search history.

(56) References Cited

U.S. PATENT DOCUMENTS 5,581,797 A * 12/1996 Baker et al. ............ 715/708

| 5,897,620 | A | | 4/1999 | Walker et al. ............ 705/5 |
|---|---|---|---|---|
| 5,899,990 | A | * | 5/1999 | Maritzen et al. ........... 707/4 |
| 5,960,411 | A | * | 9/1999 | Hartman et al. .......... 705/26 |
| 5,974,441 | A | * | 10/1999 | Rogers et al. ........... 709/200 |
| 6,188,405 | B1 | * | 2/2001 | Czerwinski et al. ...... 345/764 |

(Continued)

FOREIGN PATENT DOCUMENTS

WO WO 00/41520 7/2002

OTHER PUBLICATIONS

Greene et al., "The end of zero-hit queries: query previews for NASA's Global Change Master Directory", International Journal on Digital Libraries 2:79-90 (1999).

(Continued)

*Primary Examiner*—John Cabeca
*Assistant Examiner*—Namitha Pillai
(74) *Attorney, Agent, or Firm*—Baker Botts L.L.P.

(57) ABSTRACT

A data display comprises a window that shows a tree map display having menu information surrounding a field array of differently sized and colored or shaded areas that represent product offering possibilities that conform with user criteria entered through the surrounding menu windows. A Web site that uses the display technique may receive user criteria and retrieve a portion of collected data and display it to the user, so that the retrieved data describes a data subset that is responsive to the user criteria. The retrieved Web pages may be viewed to facilitate review of product offering information, and to facilitate purchase decisions that are transmitted from the Web site visitors.

10 Claims, 18 Drawing Sheets

U.S. PATENT DOCUMENTS 6,301,579 B1 * 10/2001 Becker .................. 707/102
6,307,573 B1 * 10/2001 Barros .................. 345/764
6,583,794 B1 * 6/2003 Wattenberg ............ 345/708

OTHER PUBLICATIONS

Johnson et al., "Tree-Maps: A Space-Filling Approach to the Visualization of Hierarchical Information Structures", Visualization 1991, IEEE Conference Oct. 1991 at 284-291.

Turo et al., "Improving the Visualization of Hierarchies with Treemaps: Design Issues and Experimentation", Proceedings of the Visualization Conference Oct. 1992, at 124-131.

"Map of the Market"; SmartMoney.com, Nov. 28, 2001 (available at http://www.smartmoney.com/marketmap/).

Au, P., Carey, M., Sewarz, S., Guo, Y., Ruger, S.; "New Paradigms in Information Visualization"; in SIGIR 2000: Procedings of the 23rd Annual International ACM SIGIR Conference on Research and Development in Information Retrieval; Blekin, et al. (Eds.); Jul. 24-28, 2000, Athens, Greece, at 307-309.

Brown, J., Gittens, S., North, C., "Treemap97 software download", Sep. 30, 1999 (available at http://www.cs.umd.edu/hcil/treemaps/treemap97.shtml).

Card, S. K. and Pirolli, P., "Display space-time resource diagrams", Palo Alto, CA (1996).

Johnson, B., Shneiderman, B.; "Treemaps: A Space-filling Approach to the Visualization of Hierarchical Information Structures"; in Proceedings of the 2nd International IEEE Visualization Conference, Oct. 1991, at 284-291. (reproduced at ftp://ftp.cs.umd.edu/pub/hcil/Reports-Abstracts-Biliography/91-06html/91-16.html.; 13 pages).

Shneiderman, B., "Treemaps for space-constrained visualization of hierarchies", Dec. 26, 1998, updated Nov. 8, 2000. (available at http://www.cs.umd.edu/hcil/treemaps/).

Bruls et al. "Squarified Treemaps," Proceedings of the Joint EUROGRAPHICS and IEEE TCVG Symposium on Visualization, (Proceedings of the Joint EUROGRAPHICS and IEEE TCVG Symposium on Visualization, Data Visualization 2000. Proceedings of the Joint EUROGRAPHICS and IEEE TCVG Symposium on Visualization, Amsterdam, Netherlands, May 29-31, 2000.) Wien, Austria: Springer-Verlag/Wein, 2000. p. 33-42.

Van Wijk, J.J. and H. van de Weteringet al. "Cushion Treemaps; Visualization of Hierarchical Information," IEEE Symposium on Information Visualization (INFOVIS '99), San Francisco, Oct. 25-26, 1999.

* cited by examiner

COMPUTER HIERARCHICAL DISPLAY OF MULTIPLE DATA CHARACTERISTICS

REFERENCE TO RELATED APPLICATIONS

This application claims the benefit of U.S. Provisional Application Ser. No. 60/220,417, entitled "Computer Display of Multiple Data Criteria", filed Jul. 24, 2000.

BACKGROUND OF THE INVENTION

1. Field of the Invention

This invention relates generally to computer systems and, more particularly, to the display of data criteria relating to a database of information.

2. Description of the Related Art

More and more people are using the Internet to search for information in response to a variety of search requests submitted over the "World Wide Web" (the "Web"). For example, one of the popular areas of Internet activity is that of shopping for goods and services. The goods and services that may be purchased over the Internet cover a wide spectrum of industries. Though Web sites are increasingly being designed with convenient access in mind, it is quite often a cumbersome process for users to gather an appropriate collection of offerings that are of interest and to actually make a purchase decision. The process typically involves jumping back and forth among many different Web pages, and even from Web site to Web site.

A Web shopping site for airline travel, for example, may permit a traveler to supply a starting location, destination location, and travel dates from an input screen. The Web site may then locate airline carriers that meet the requirements, and return a list of times, airports, and carriers to the user in another display. The list of information typically is arranged in a column format, with column headings of departure time, arrival time, price, airport, carrier, and so forth. The Web site may collect additional information from the user, such as class of service, fare structure, and the like, from additional input screens, and may list the added information it locates amongst the columns of information displayed for the user. The user is typically given an opportunity to make a flight selection, which takes the user to yet another Web page, where the Web site typically will ask if the user wants to make a flight reservation or purchase. If the user answers affirmatively, the user is typically directed to another Web page or screen, where the requisite information is collected and then processed.

The number of Web site pages that must be viewed to retrieve desired information and effectuate a purchase makes the process cumbersome and can be confusing. Some users may give up in frustration before making a purchase decision. Other commercial Web sites may suffer from similar problems, such as bookstores, clothing, computer retailers, and the like.

From the discussion above, it should be apparent that there is a need for gathering information on offerings of goods and services as selected by shoppers, and then presenting information about the shopping criteria of the shopper in a convenient display for easier comparison shopping, to facilitate purchase decisions. The present invention fulfills this need.

SUMMARY OF THE INVENTION

Disclosed is a computer system and method that allows a user to hierarchically search data and browse the results of the search using hierarchical display of the search results. In one aspect of the invention, there is disclosed a method for causing a computer to accept user criteria for obtaining a subset of data related to products that are available for purchase. The computer peruses a database and retrieves a data subset that meets the user criteria, wherein the data subset comprises one or more data elements. Each data element is related to one or more products that may be available for purchase. The computer preferably generates a display that includes a representation of the data in a hierarchical manner, such as in a tree map format.

The display is representative of the data subset and comprises plural bounded field areas, wherein each bounded field area corresponds to a product category. Preferably, one or more of the bounded field areas is divided into plural bounded subfield areas. Each of the bounded subfield areas corresponds to and represents a product. In order to assist a user in evaluating the products, each bounded subfield area has a first attribute that is indicative of a first characteristic of the corresponding product. Advantageously, the plural bounded field areas and the bounded subfield areas are all contained within a single viewable region of a computer display screen to allow the user to easily examine the products.

The display may also include a menu item that provides the user with the ability to insert any product corresponding to a subfield area into an electronic shopping cart. A shopping cart item may provide a tally of any products that have been inserted into the shopping cart. Additionally, the display may include a selectable item such as a button that, when selected, initiates a purchase transaction of all of the items in the shopping cart.

The display may also include pop-up windows that are generated in response to the user manipulating a display cursor. The pop-up windows include items of information related to the products. Preferably, the display also includes menus that allow the user to vary the criteria upon which the data is grouped and displayed.

Other features and advantages of the present invention should be apparent from the following description of the preferred embodiment, which illustrates, by way of example, the principles of the invention.

DESCRIPTION OF THE PREFERRED EMBODIMENT

Figure 1:
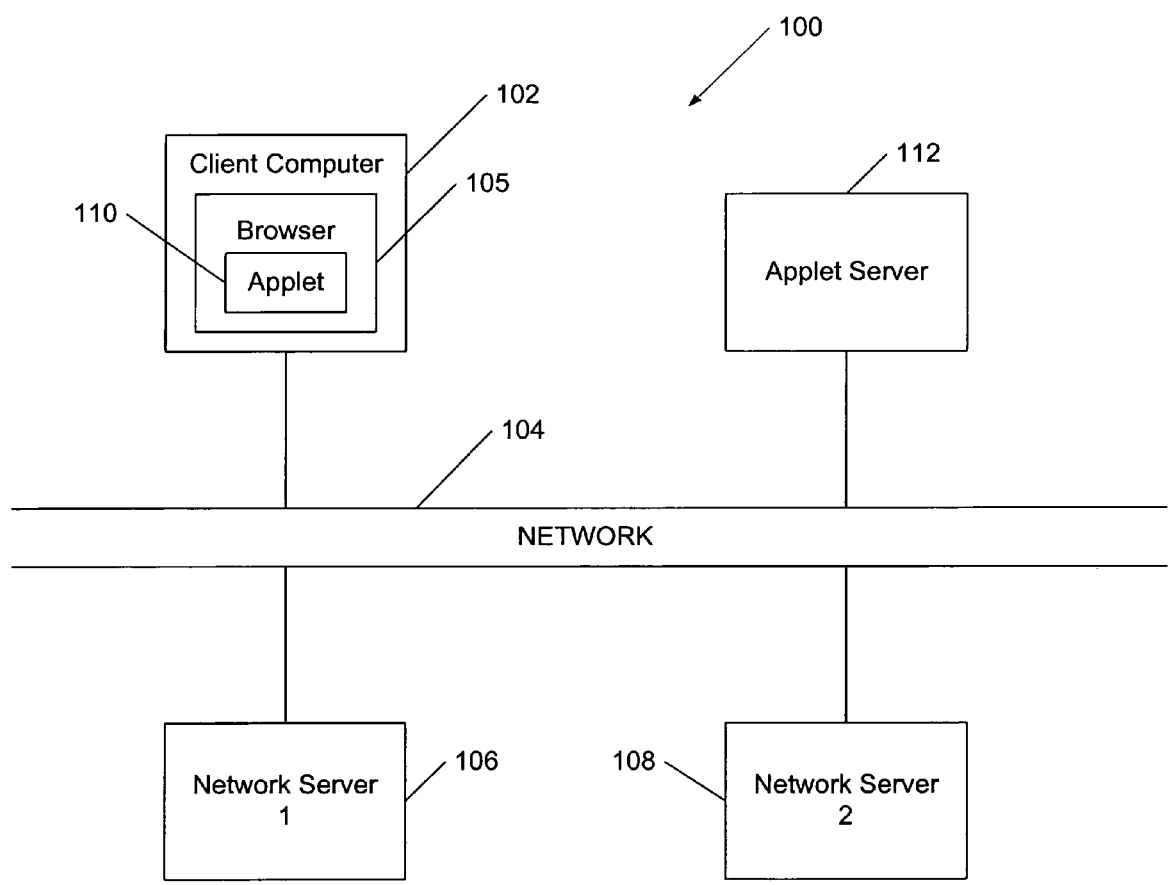
FIG. 1 is a block diagram representation of a computer system that implements the display processing of the present invention.

FIG. 1 is a block diagram representation of a computer system 100 with a client computer 102 connected to a network 104, such as the Internet. The client computer includes a browser application 105. The client computer 102 communicates with network node computers indicated as a Network Server 1 computer 106 and a Network Server 2 computer 108 in a communications session. The client computer 102 requests network data, such as Web pages, from the network server computers 106, 108. For suitably configured Web sites, the HTML code of the Web pages from the server computers 106, 108 includes a tag for an applet program 110. The tag may direct the client browser application 105 to receive the applet program 110 from an applet server computer 112 of the computer network, or the tag may incorporate program instructions of the applet 110 or instructions that implement the functionality of the applet. The browser application 105 hosts the applet program 110.

The computer system 100 is configured to implement processing steps wherein at least one of the one Network Servers 106 or 108 receives user-specified criteria for obtaining information from a database, which may be, for example, data distributed in storage across the network or data located in a single data store. The client computer 102 peruses the data and identifies a subset of the data, the subset being comprised of one or more data elements that meet the specified criteria. The client computer 102 then generates a information review page on a display screen of the client computer 102, preferably using the applet 110. The information review page provides a simple representation of the data subset including visual representations of one or more aspects of the data, as described more fully below with respect to FIGS. 3A-3E. The applet 110 allows for user adjustments of the display and efficient navigation of the data in the data subset.

It will be appreciated that the computer system shown in FIG. 1 is an exemplary embodiment of how the functionality described herein may be implemented. The client-server computer system of FIG. 1 could be replaced by a single computer device and database, the computer device having computer-readable program instructions that would implement the functionality of the applet described herein. Additionally, the data could be stored locally on the computer device or could be stored in one or more data storage devices that are remote from the computer device. For example, the computer device could be a hand-held computer device having a processor that is configured to respond to instructions that implement the functionality of the applet 110.

In a preferred embodiment, the data in the database is related to products that are preferably available for purchase over the network. The computer system 100, via the client computer 102, accepts one or more criteria related to products that the user desires to analyze or purchase. The servers 106, 108 then peruse a database of products, retrieve at least a portion of product data that meet the criteria, and then instruct the client computer 102 to display the data in the information review page. The user may analyze the product data and transfer purchase decisions regarding one or more products to the servers via interaction with the tree map display.

The data to be searched according to the user criteria is preferably maintained in a database that is comprised of a collection of one or more data elements that are each defined by one or more "dimensions" each of which has a magnitude or alphanumeric value that represents a characteristic of the data element. For example, data elements for the purchase of services may be characterized along dimensions of price, size, and reservation date. The data elements may be assembled into groups, each of which pertains to a particular data category. The groups may comprise, for example, airline reservations or hotel accommodations responsive to the user's criteria.

In the context of the data relating to product information, each data element preferably relates to a product or set of products that are available for purchase or selection. The dimensions of such a data element could include any specification that is descriptive of the product, such as the price of the product, the type of product, the size of the product, and so forth. For example, if the data element relates to a house that is being offered for sale, the dimensions of such a data element could include the price of the house, location of the house, the number of rooms in the house, and the size of the house.

The specific quantity and type of dimensions of a particular data element could vary depending on the type of product to which the data element is related. In another example, the data element could relate to clothing offered for sale, where the dimensions include the article of clothing, the price of the article, the size of the article, and the color of the article.

The database could include data that are collected from a more expansive database and stored in a data store. The database could also be data that are stored over one or more data stores, such as data that are stored in data stores that are linked over the Internet.

database is sometimes described herein in the context of a collection of travel-related information wherein the data elements each relate to a travel-related product or service that is available for purchase, such as an airline ticket, a car rental, or a hotel accommodation. For example, a data element could relate to an airline ticket wherein the dimensions of the data element include price, time of departure, time of arrival, airline and flight class. Although the data are described herein in the context of travel-related product offerings, it will be appreciated that the data could also relate to other types of product offerings. Indeed, the data could relate to any subject matter where multiple dimensions of information are presented to the user via a single display screen.

Figure 2:
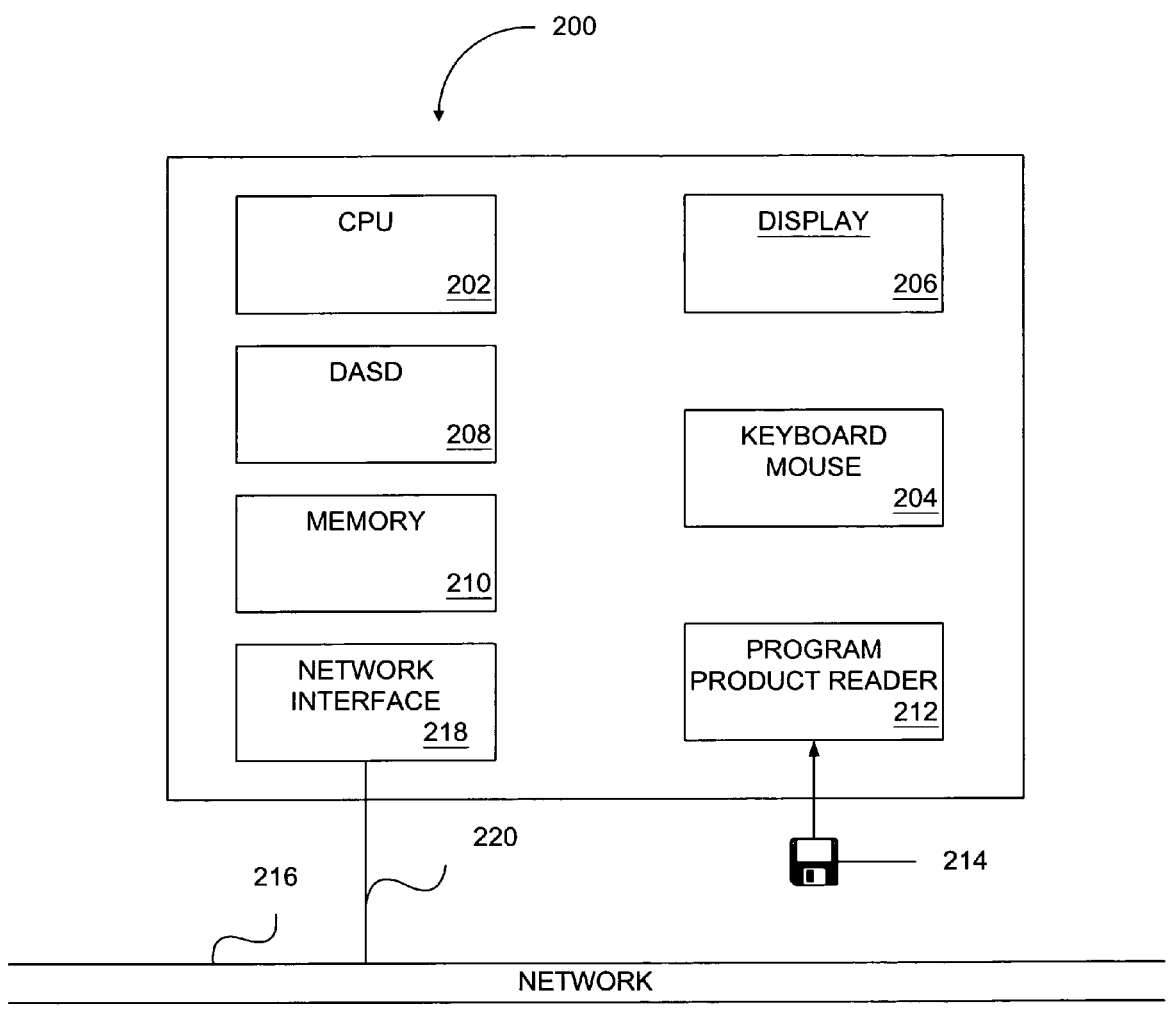
FIG. 2 is a block diagram that illustrates the construction of one of the computers of FIG. 1.

The client computer 102 that implements the display processing, or any other computer device of the network system 100, may comprise any conventional computer suitable for implementing the functionality described herein. The client computer may comprise, for example, an Internet-connected personal computer (PC) or a Web-enabled appliance. FIG. 2 is a block diagram of an exemplary computer device 200 such as might comprise any of the computing devices shown in FIG. 1. Each computer operates under control of a central processor unit (CPU) 202, such as an application specific integrated circuit (ASIC) from a number of vendors, or a "Pentium"—class microprocessor and associated integrated circuit chips, available from Intel Corporation of Santa Clara, Calif., USA. Commands and data can be input from a user control panel, remote control device, or a keyboard and mouse combination 204 and inputs and output can be viewed at a display 206.

The display 206 is typically a video monitor or flat panel display device. As will be known to those of skill in the art, a conventional display includes a display screen that defines a viewable region having a fixed, two-dimensional area.

If the computer device 200 comprises a personal computer, then it preferably includes a direct access storage device (DASD) 208, such as a fixed hard disk drive (HDD). The DASD may be used to store the operating system of the computer 200, but in the case of a Web-enabled appliance or other computer device of more modest capability, the memory is likely limited to some form of programmable read-only-memory or EPROM (flash memory). The memory 210 typically comprises volatile semiconductor random access memory (RAM) in the case of a personal computer. If the computer device 200 is a personal computer, it preferably includes a program product reader 212 that accepts a program product storage device 214, from which the program product reader can read data (and to which it can optionally write data). The program product reader can comprise, for example, a disk drive, and the program product storage device can comprise removable storage media such as a magnetic floppy disk, an optical CD-ROM disc, a CD-R disc, a CD-RW disc, a DVD disk, or the like. Semiconductor memory devices for data storage may also be used for the program product storage device.

If the computer device 200 is part of a network, such as a group of computers serving a data management function, then each computer 200 can communicate with the other connected computers over a network 216 through a network interface 218 that enables communication over a connection 220 between the network and the computer device.

The CPU 202 operates under control of programming steps that are temporarily stored in the memory 210 of the computer 200. When the programming steps are executed, the pertinent system component performs its functions. Thus, the programming steps implement the functionality of the system illustrated in FIG. 1. The programming steps can be received from the DASD 208, through the program product 214, or through the network connection 220, or can be incorporated into an ASIC as part of the production process. If the computing device includes a storage drive 212, then it can receive a program product, read programming steps recorded thereon, and transfer the programming steps into the memory 210 for execution by the CPU 202. As noted above, the program product storage device can comprise any one of multiple removable media having recorded computer-readable instructions, including magnetic floppy disks, CD-ROM, and DVD storage discs. Other suitable program product storage devices can include magnetic tape and semiconductor memory chips. In this way, the processing steps necessary for operation in accordance with the invention can be embodied on a program product.

Alternatively, the program steps can be received into the operating memory 210 over the network 216. In the network method, the computer receives data including program steps into the memory 210 through the network interface 218 after network communication has been established over the network connection 220 by well-known methods that will be understood by those skilled in the art without further explanation. The program steps are then executed by the CPU 202 to implement the processing of the system of the present invention.

The Product Review Page

Figure 3A:
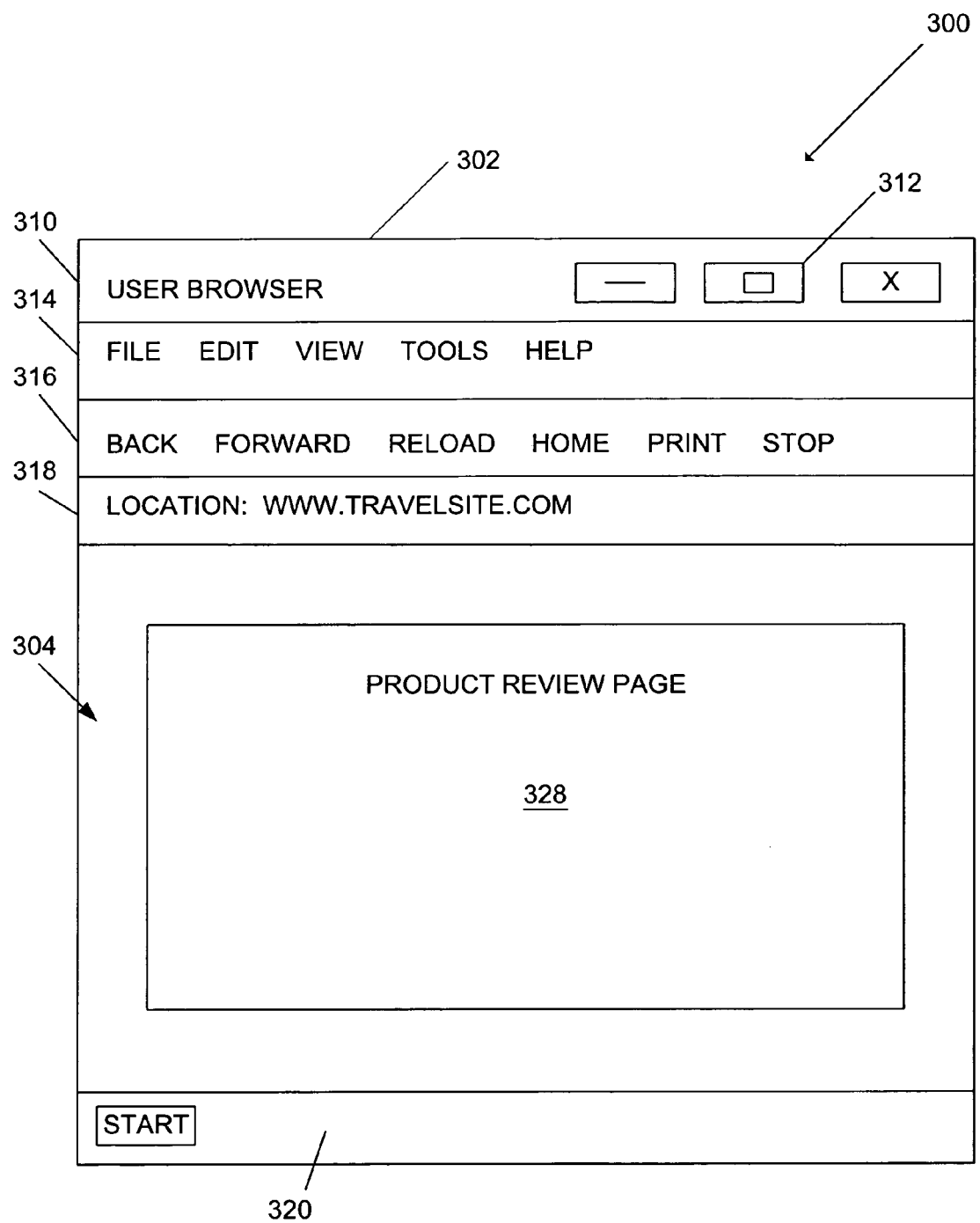
FIG. 3A is an illustration of a display screen produced by the computer processing system illustrated in FIG. 1 at a client node, showing a browser window that is configured to include a product review page display.

FIG. 3A is an illustration of a display 300 that is produced on a computer display screen of the client computer 102. The display 300 includes a browser display window 302, which includes an active area 304 that is configured to display a Web page. The active area 304 shows a "Product Review Page" 328 of a Web site that is being visited by the user.

The browser display window 302 further includes well-known window artifacts, such as a title bar 310 with window sizing icons 312, a menu bar 314, a browser navigation tool bar 316, and a location or address window 318. A task bar or system tray 320 resides at the bottom of the display. Although the FIG. 3A display window shows a configuration typical for an operating system such as "Windows 98" by Microsoft Corporation, it should be understood that the program that produces the information review page in accordance with the invention also can be interfaced with other computer operating systems, such as the "Macintosh" operating system by Apple Computer Corporation and the various UNIX operating systems that are available.

Figure 3B:
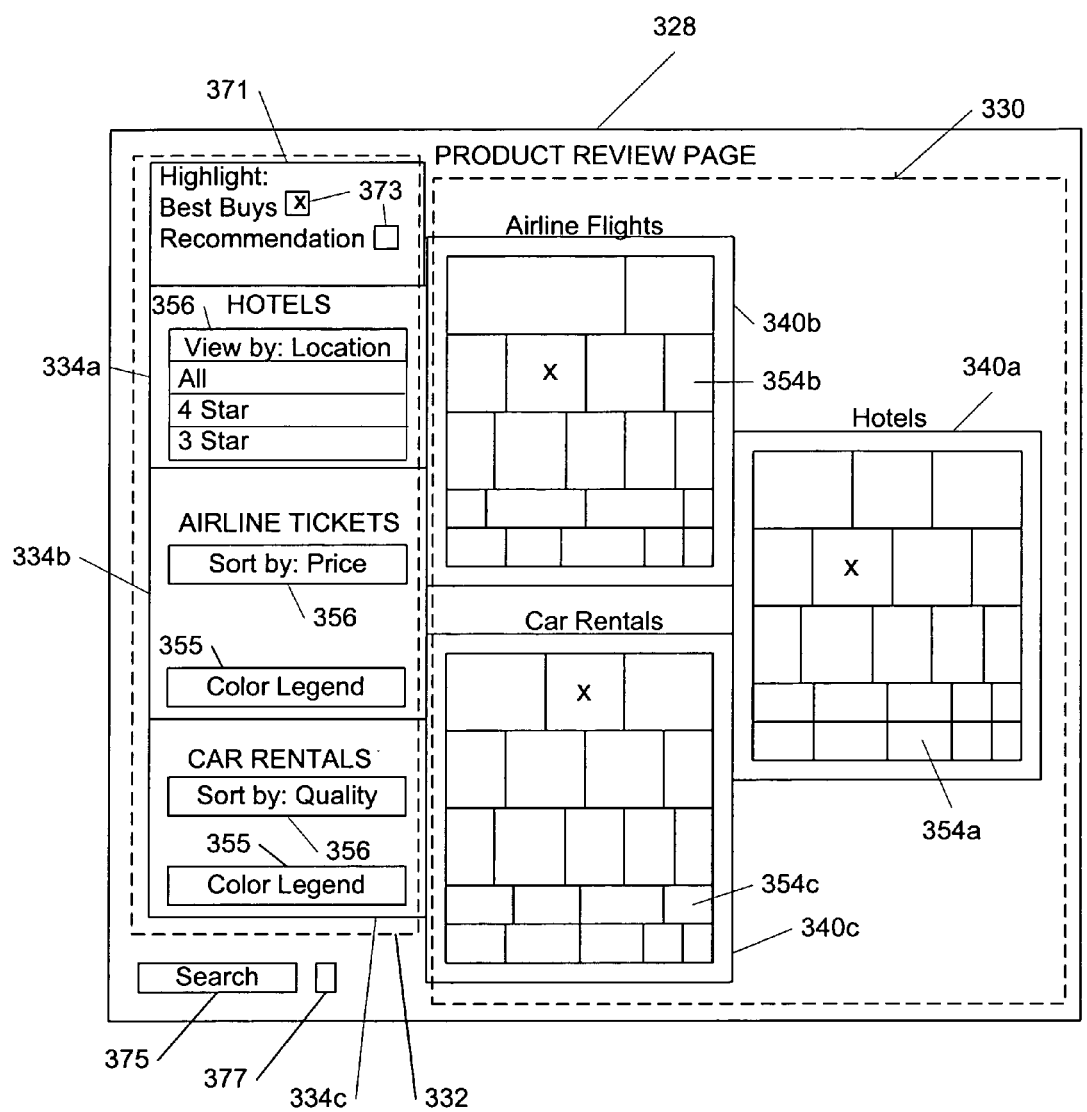
FIG. 3B is an illustration of a display screen produced by the computer processing system illustrated in FIG. 1 at a client node, showing a detailed view of the product review page display that is included in the browser window of FIG. 3A.

The active area 304 includes the Product Review Page 328 which displays information in a tree map format. For clarity of illustration, the Product Review Page 328 is represented as a blank box in FIG. 3A and a detailed illustration of the Product Review Page 328 is shown in FIG. 3B. With reference to FIG. 3B, the Product Review Page 328 includes a two-dimensional field array 330 of information including one or more tree maps. A menu array 332 comprised of one or more menus 334a, 334b, and 334c is located adjacent the field array 330. The menus determine the display configuration of the field array 330, as described further below The field array 330 includes a plurality of field areas 340 each comprised of a distinct region of the screen display and each having a predetermined geometric shape. For convenience, the reference numeral 340 is used to collectively refer to plural field areas and individual field areas are referred to using the reference numeral 340 followed by a letter suffix. Preferably, the field areas 340 are each surrounded by a pronounced border which serves as a visual designation of the respective field area.

Each field area 340 consumes a two-dimensional display area that is indicative of a first data criteria, such as a group data category, of a data subset. That is, each of the field areas 340 represents a particular group of data or category of data. For example, the first field area 340a relates to a "Hotel" data category, another field area 340b relates to a "Airline Flight" data category, and the last field area 340c relates to a "Car Rental" data category. In the context of service and product offerings, there could be a field area associated with any of a wide variety of categories.

Each field area 340 is divided into one or more subfield areas 354 each having a geometric shape that consumes a given region of the display screen. Each subfield area 354 represents one or more data elements that belong to the category of data represented by the corresponding field area 340. In the context of a product offering, each subfield area 354 is representative of one or more products. The products could also be available for purchase or selection using the Product Review Page.

For example, the subfield area 354a in the "Hotel" field area 340a is representative of a particular hotel accommodation that is available for purchase. Likewise, the subfield area 354b in the "Airline Flight" field area 340b is representative of a particular scheduled airline flight that is available for purchase. The subfield area 354c represents a car rental that is available for purchase. Thus, the subfield areas 354 could be used to represent any item or product available for selection or purchase. For clarity of illustration, only some of the subfield areas 354 have been labeled with a reference numeral, although it is appreciated that all of the subdivisions of the field areas 340 are subfield areas.

Each subfield area 354 has one or more attributes that are indicative of one or more dimensions of the corresponding data element. Accordingly, a user can obtain information regarding one or more dimensions of a particular data element by examining the various attributes of the subfield area associated with that data element. In a preferred embodiment, one such attribute of each of the subfield areas 354 is the size of the particular subfield area 354 (i.e., the amount of two-dimensional display space consumed by the subfield area). Another attribute is the fill color or fill pattern of the subfield area. The location of the subfield area with respect to other subfield areas also may be an attribute that indicates a dimension of the data element. Thus, multiple attributes of the data element may be readily observed by a user.

It will be appreciated that the type of attribute that is used to indicate the dimensions of the data element could vary. The attributes could be, a visual attribute, such as the size or color of the data element. The attribute could also be an aural attribute, such as a sound that is associated with a subfield area. The attributes of the data element could include anything that could be detectable by a human sense and that could be associated with the data element.

For example, if the subfield areas 354 represent products that are available for purchase, the two-dimensional screen size of a subfield area 354 could indicate some characteristic of the product represented by that subfield area. For example, the screen size of the "hotel room" subfield area 354a might be a visual indication of the "quality rating" for the associated hotel room. A hotel room with a higher quality rating would be represented by a subfield area 354 that is larger in size than a hotel room with a lower quality rating. As discussed below, the color or shading of the subfield area 354 may also indicate quality rating, or may be used to indicate a different attribute, such as price.

In another example, the size of the "Airline Flight" subfield area 354b might indicate the price of the associated airline flight ticket. Airline tickets of higher price would be represented by subfield areas 354 of larger size than airline tickets of lower price. The user can thus easily compare various qualities of the products by comparing the relative sizes of the subfield areas 354 that represent the products.

As mentioned, the screen color or shade of color that fills a particular subfield area 354 could be another attribute that indicates the value of a dimension of the corresponding data element. Preferably, subfield areas 354 located within a common field area 340 have the same basic color and variances in shade indicate the variance in magnitude along a selected product dimension. The subfield areas 354 could also vary across more than one color wherein changes between one or more colors indicate changes in the dimensions associated with the subfield areas 354. For example, the subfield areas 354 in field area 340 could range from red to purple and to red with the variance in color corresponding to the variance in a dimension of the associated data elements.

For each field area 340, a color legend 355 is preferably located on the page 328 to assist the user in ascertaining the meaning or significance of particular colors or shades of colors. It will be appreciated that a fill design, such as a hatching, could be used in place of color. If size of the subfields 354 indicates quality and shading indicates price, then it should be apparent that the greatest economic choice would be represented by maximizing an acceptable size with the lightest color.

In the context of the subfield areas 354 representing a particular product, the subfield area's color provides a visual indication of some characteristic of the corresponding product. For example, the color of the "hotel room" subfield area 354a could indicate the price of the hotel room. Hotel rooms of darker color could have a higher price than hotel rooms of lighter color. Accordingly, a user could easily ascertain and compare variances in prices of hotel rooms by observing the variances in color shade of the associated subfield areas 354 within the "hotel" field area 340a. The visual attributes of the subfield areas 354 could be used to signify variances in qualities of any of a wide variety of products.

Another attribute of the subfield area could be the location or position of the subfield area on the screen with respect to other subfield areas. In other words, the position of a subfield area 354 with respect to other subfield areas 354 also provides information regarding the data element associated with that subfield area 354. Preferably, subfield areas 354 that represent a product of a particular quality are located near subfield areas 354 of similar quality. Accordingly, subfield areas are grouped with other subfield areas that have some similar quality. For example, subfield areas that represent items of a particular price are grouped with other subfield areas of a similar price in the Product Review Page 328.

The user can preferably manually change the factors that govern the groupings of the subfield areas 354 so that the subfield areas 354 will be grouped according to user-specified criteria. For example, the user could specify that the hotel subfield areas should be grouped by hotel brand or by price. Alternately, the subfield areas 354 could be grouped by location.

Other products, such as televisions, could be grouped by screen size or by brand name. Another product such as coffee could be grouped according to flavor of the coffee or region of the coffee. The Product Review Page 328 preferably initially defaults to groupings that conform to general user expectations but also allows for user customization via the menus 334. Advantageously, the user can easily change the grouping criteria on the fly using the menus 334, as described more fully below.

Furthermore, the user could use the menus 334 to filter out data elements that do not meet specified criteria. For example, in the Hotels field area 340*a*, the user could preferably specify that hotels above a certain price range be filtered from display. This will allow the user to customize the page to the user's needs.

The field areas 340 and subfield areas 354 are preferably polygonal in shape. In a preferred embodiment, the subfield areas 354 are each rectangular and each have an aspect ratio (i.e., ratio of length to width) that is preferably close to 1 to avoid slender, elongated subfield areas.

With reference still to FIG. 3B, the menus 334 preferably each include menu items 356 that allow a user to specify criteria that governs how the data will be sorted and how the page 328 is arranged. Preferably, each menu 334 is associated with one or more field areas 340. The menu items 356 preferably include drop down menus or data entry fields that allow a user to specify criteria by which the program 110 sorts and displays the data elements represented by the subfield areas 354. Preferably, the menus 334 allow the user to widen or narrow the criteria used for displaying data elements. For example, the menu 334*a*, which is associated with the "Hotel" field area, allows the user to cause the client computer 102 to display only subfield areas 354 that represent hotel rooms within a particular quality range, such as only 3 star or only 4 star hotels. The user can thus use the menus to cause the client computer 102 to narrow (or widen) the range of products that are being displayed in the field arrays 340.

The menus 334 allow the user to customize the display of data according to user needs, such as by allowing the user to specify how the subfield areas 354 are grouped. Preferably, the user can specify a grouping criteria using the menus 334. Preferably, the menus 334 also allow the user to divide the field areas 340 into subgroupings so that subfield areas 354 within a particular field area 340 could grouped together and distinguished. For example, the user could use the menu 334 to cause the Hotel subfield areas 354 to be grouped by location so that hotels within a certain location are grouped together. Additionally, the user could cause the Hotel field area 340 to be divided into multiple groupings wherein hotels from one location are grouped together and hotels from another location are also grouped together.

In one embodiment, the Product Review Page includes a Highlight box 371 that allows a user to highlight all subfield areas 354 that meet a specified criteria. The Highlight box 371 preferably includes a fixed criteria or a user-specified criteria that a user can activate such as by clicking on an associated activation box 373. When the user activates the highlight criteria, then all subfield areas 354 that meet the selected highlight criteria will be distinguished in some manner, such as by marking the appropriate subfield areas with a marker or bolded border. In the embodiment shown in FIG. 3B, the highlight criteria correspond to products that have been deemed best buys and recommended products. When the user clicks on the associated activation box, then the subfield area(s) 354 that meet the activated highlight criteria are marked with an X. Accordingly, Web site owners or vendors can use the Highlight box 371 as a way of generating user interest in particular products. Additionally, user of the Web site can use the Highlight box 371 as an aid for identifying products that are of interest.

With reference to FIG. 3B, the product Review Page 328 may also include a search interface 375 that allows a user to search for data elements that match or relate to a search string. The search interface comprises a field in which the user may enter alphanumeric characters that specify a search string. The user can cause the client computer 102 to initiate a search of the database for data elements that match or relate to the search string using a button 377.

Figure 3C:
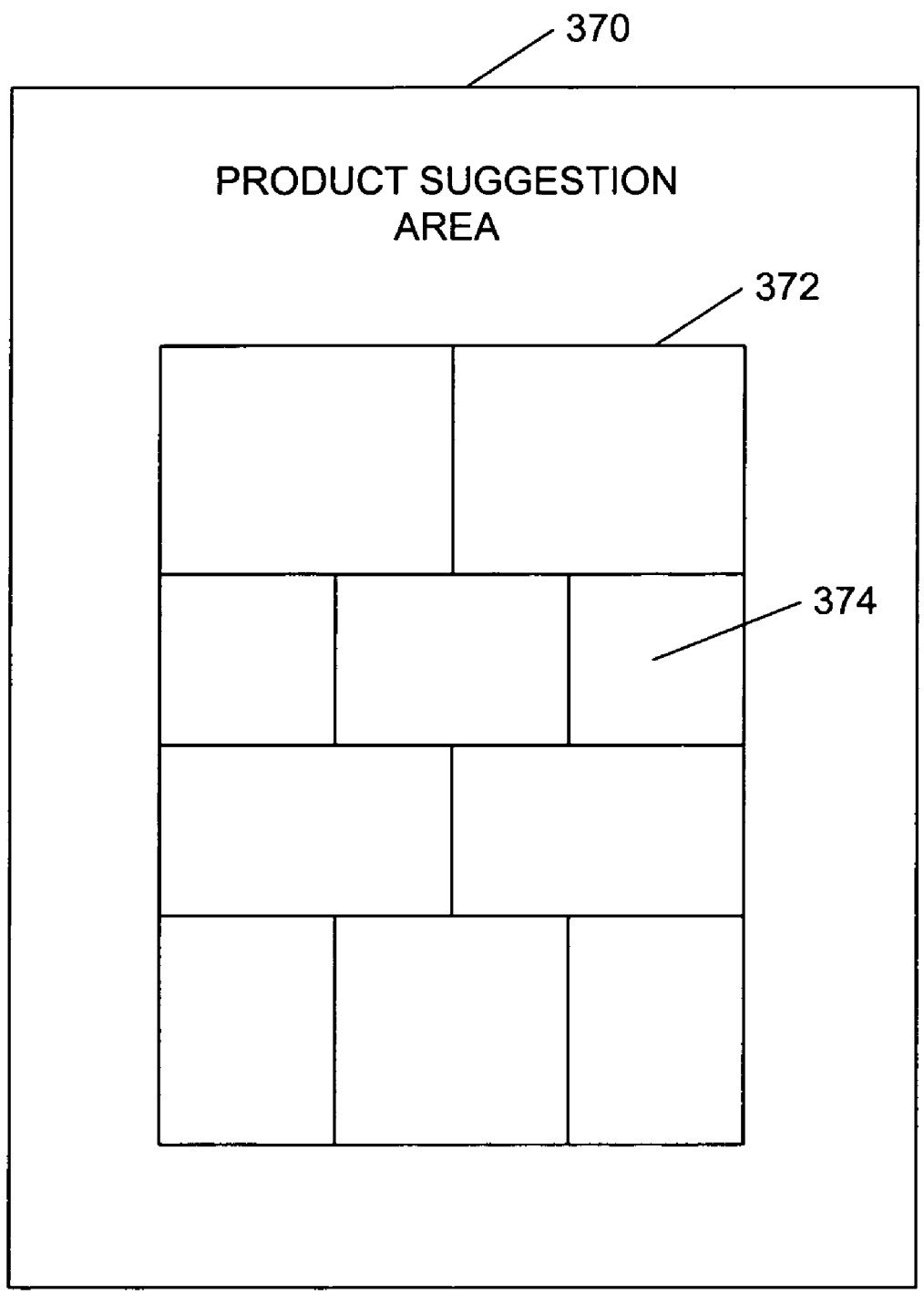
FIG. 3C is an illustration of a display screen produced by the computer processing system illustrated in FIG. 1 at a client node, showing a data criteria suggestion box of the product review page display.

With reference to FIG. 3C, the page 328 may further include a data criteria suggestion area 370 comprised of a bounded field area 372 that is divided into one or more subfield areas 374. The field area 372 includes subfield areas that are each representative of data elements that do not exactly meet criteria specified by the user but are somewhat closely related to the criteria so as to be deemed to be of some interest to the user. The data elements represented in the field area 372 might meet a given percentage of the criteria specified by the user, wherein the percentage cutoff may be arbitrarily determined by the user or by a third party.

The data criteria suggestion area 370 is shown in FIG. 3C as a Product Suggestion Area that includes bounded subfield areas 372 that are each representative of one or more products that do not exactly meet the user-specified criteria but nonetheless might be of interest to the user. For example, if the products are airline tickets, the Product Suggestion Area could include airline tickets that have departure times outside of the specified time criteria but which have other qualities, such as reduced price or free class upgrades, that might make the product of interest to the user. Advantageously, product vendors could utilize the Product Suggestion Area to promote new or unique products that the user would not necessarily consider buying but would likely be of interest because they closely meet the user criteria.

Figure 3D:
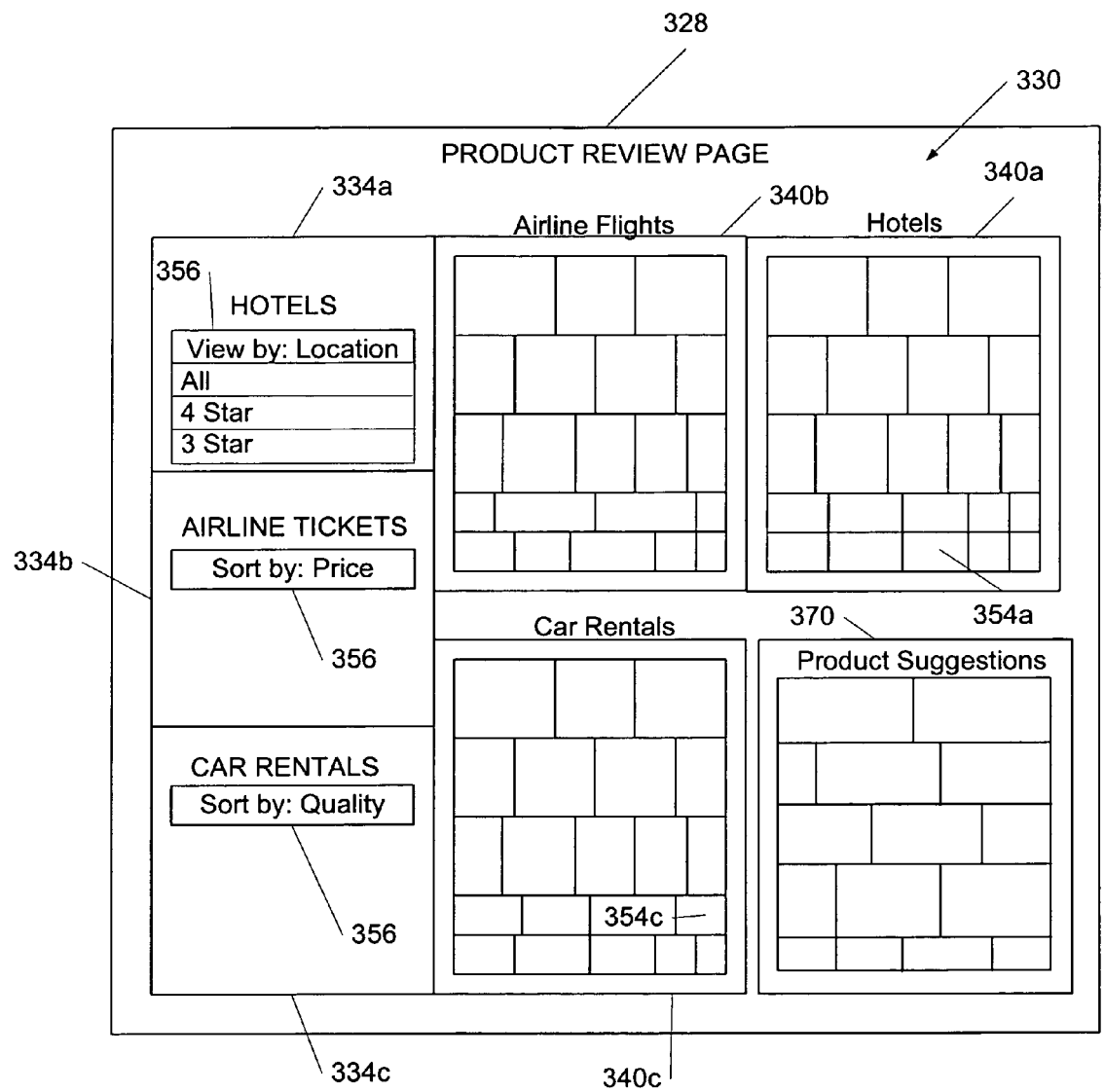
FIG. 3D is an illustration of a display screen produced by the computer processing system illustrated in FIG. 1 at a client node, showing a detailed view of another embodiment of the product review page display.
Figure 3E:
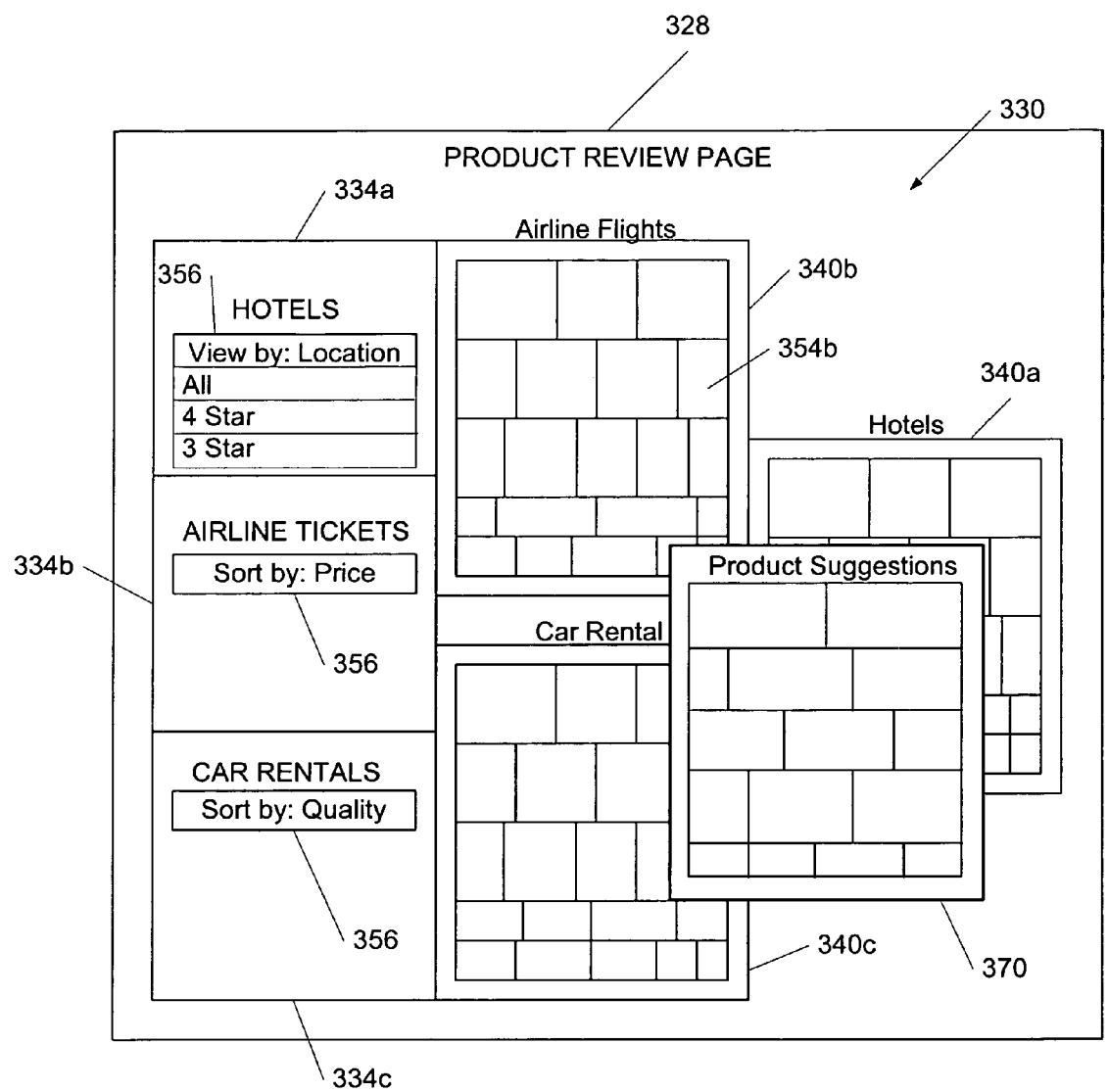
FIG. 3E is an illustration of a display screen produced by the computer processing system illustrated in FIG. 1 at a client node, showing a detailed view of another embodiment of the product review page display with a product suggestion pop-up window.

The data criteria suggestion area 370 could be incorporated as a permanent fixture into the Product Review Page 328, such as is shown in FIG. 3D. Alternatively, the criteria suggestion area 370 could be generated as a pop-up window in response to the user prompting the client computer 102 for data criteria suggestions, such as is shown in FIG. 3E.

Preferably, the entire Product Review Page 328, including all of the field areas 340 and the menus 356, has a size such that the field areas and the menus can be simultaneously contained within a single viewable region of a computer display device. That is, the user is desirably not required to scroll or switch between screen displays in order to view the entire Product Review Page 328. In this manner, the user can examine various aspects of a data subset from a single display screen. Advantageously, the user can search data and arrange the data in a hierarchical display that is easily browsed.

The display generation and interactivity of the Product Review Page 328 may be implemented in a browser-compatible language, such as the "Java" programming language, as described in more detail below.

Implementation of the Product Review Page

Figure 4:
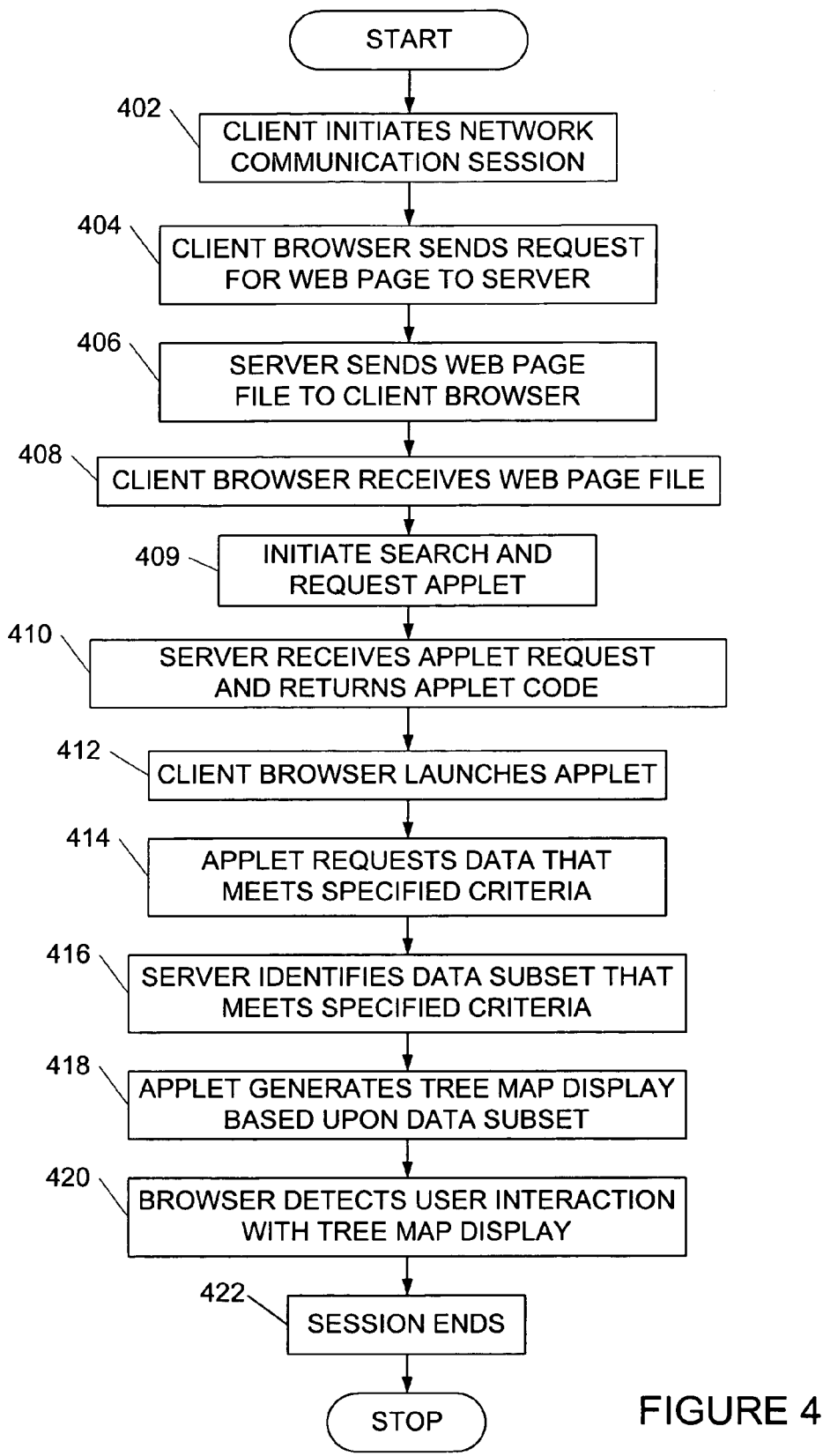
FIG. 4 is a flow diagram that illustrates the processing steps executed by the computer system of FIG. 1 to generate a product review page display in response to user-specified criteria.

FIG. 4 is a flow diagram that illustrates the processing operations executed by the computer system 100 of FIG. 1 to obtain and execute the applet program 110 of FIG. 1. The applet program 110 causes the client computer 102 to generate the Product Review Page shown in FIGS. 3A-3E. In the first operation, represented by the flow diagram box numbered 402, the client computer 102 initiates a network communication session. In the context of an Internet application of the invention, the client is the computer at which a user initiates an Internet session.

Next, a host application at the client computer 102, such as the Web browser application 105, requests a portal Web page from a server computer. This operation is represented by the flow diagram box numbered 404. The request for the portal Web page may be made, for example, by clicking on a hyperlink displayed in the Web browser at the client computer 102 or by some other means of sending the URL (uniform resource locator) of the desired Web page to the server computer. In the flow diagram box numbered 406, the server computer matches the received request to the appropriate portal Web page in the form of a file containing hypertext mark-up language (HTML) code, which is sent to the client browser application 105.

In the next operation, represented by the flow diagram box numbered 408, the Web browser application 105 at the client computer 102 receives the HTML code for the portal Web page and, in accordance with conventional browser functioning, processes the HTML code for display as a Web page.

Figure 5:
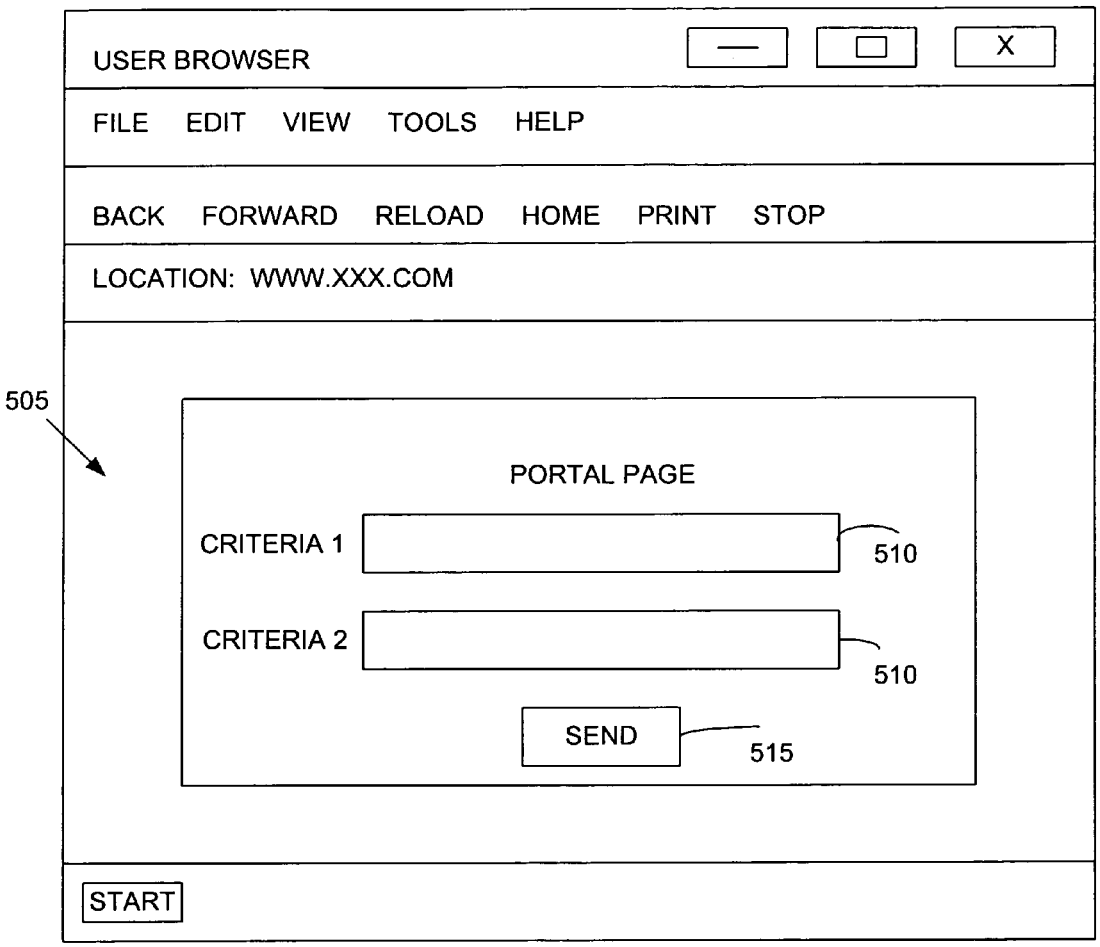
FIG. 5 is an illustration of a display screen produced by the computer processing system illustrated in FIG. 1 at a client node, showing a portal Web page for the product review page display.

FIG. 5 is an illustration of a display screen for an exemplary portal Web page 505. The portal web page 505 allows a user to specify one or more criteria that will be used to sort the information in the database for display as a tree map. The portal web page 505 preferably includes one or more fields 510 in which the user may enter criteria. Preferably, the criteria pertains to a category or subject matter of information that the user wishes to view. For example, if the user wishes to view information regarding products that are available for purchase, the user would enter criteria such as product categories, price range, and other specifications. In the context of travel-related products, the user might enter as criteria desired destination locations in one or more of the fields 510.

Alternately, the fields 510 may be replaced by drop down menus that limit the searchable subject matter to specific subjects or categories to thereby guide the user's search. For example, a vendor of products could have a web page that is tailored to display product information for specific product categories.

The portal web page 505 further includes a "send" button 515. The user selects the button 515 to initiate the search in accordance with the criteria.

The HTML code of the portal Web page 505 preferably includes a reference or tag to the tree map applet program 110. The HTML code identifies the server applet to the browser application 105 and provides parameters necessary for the browser application to receive and launch the applet program 110. In response to the user clicking on the send button 515, the browser application 105 initiates a search in accordance with the criteria and sends a request to the server for the corresponding applet file. With reference again to FIG. 4, this is represented in the flow diagram box numbered 409.

The flow diagram box numbered 410 indicates that the next operation is for the server computer to receive the request for the applet program 110 and to return a data file containing the applet code and information relating to an appropriate "virtual machine", which by emulation will execute the applet code.

Next, in the flow diagram box numbered 412, the client browser "Java" virtual machine receives the applet code, checks it for validity, and then constructs an object of the applet class. The browser program 105 then initializes the applet object and starts its execution, thereby executing the applet code instructions.

The next operation is for the applet object to execute its instructions, such as by constructing specified objects and requesting data. In the operation represented by the flow diagram box numbered 414, the applet program 110 first requests data from the server computer, wherein the data meets the criteria specified by the user. In the next operation, represented by flow diagram box 416, the server computer identifies a subset of data from a database that meets the specified criteria. As mentioned, the database is comprised of a collection of data elements.

The server computer preferably compares the criteria to the collection of data elements and identifies a subset of one or more data elements that meet the criteria. The server computer then constructs one or more data objects that represent the data subset. The perusal and organization of data could be performed by the server computer or by the client computer.

For example, assume that the user specified "Hawaii" as criteria for a destination location and also specified available hotels, car rentals, and airline flights as additional criteria. The resulting data subset will include data elements that meet the specified criteria, such as product offerings for specific hotels, car rentals, and airline flights in and to Hawaii. This operation may be performed at either the client computer 102 or at the server computer.

Next, in the flow diagram box numbered 418, the applet program 110 uses the previously constructed data objects to generate a product review page for presentation to the user. As discussed above with reference to FIG. 3, the product review page includes field areas and subfield areas that are representative of data elements that meet the user-specified criteria. The method by which the applet program configures and draws the product review page is described below in more detail with reference to the flow chart shown in FIGS. 10 and 12.

During execution of the applet code, the browser program 105 detects user interaction with the product review page including events such as keyboard keystrokes and mouse movement when a display cursor is positioned in the product review page. Such events will be passed on to the tree map applet program 110 for further processing, as indicated by the flow diagram box numbered 420 and described in more detail below with reference to FIGS. 6-9.

After a time, the user may end the communications session, executing a logoff operation to disconnect from the Internet and shut down the browser, thereby terminating the applet. This is indicated by the flow diagram box numbered 422. Other operations of the client computer may then continue.

User Interaction with the Product Review Page

Figure 6:
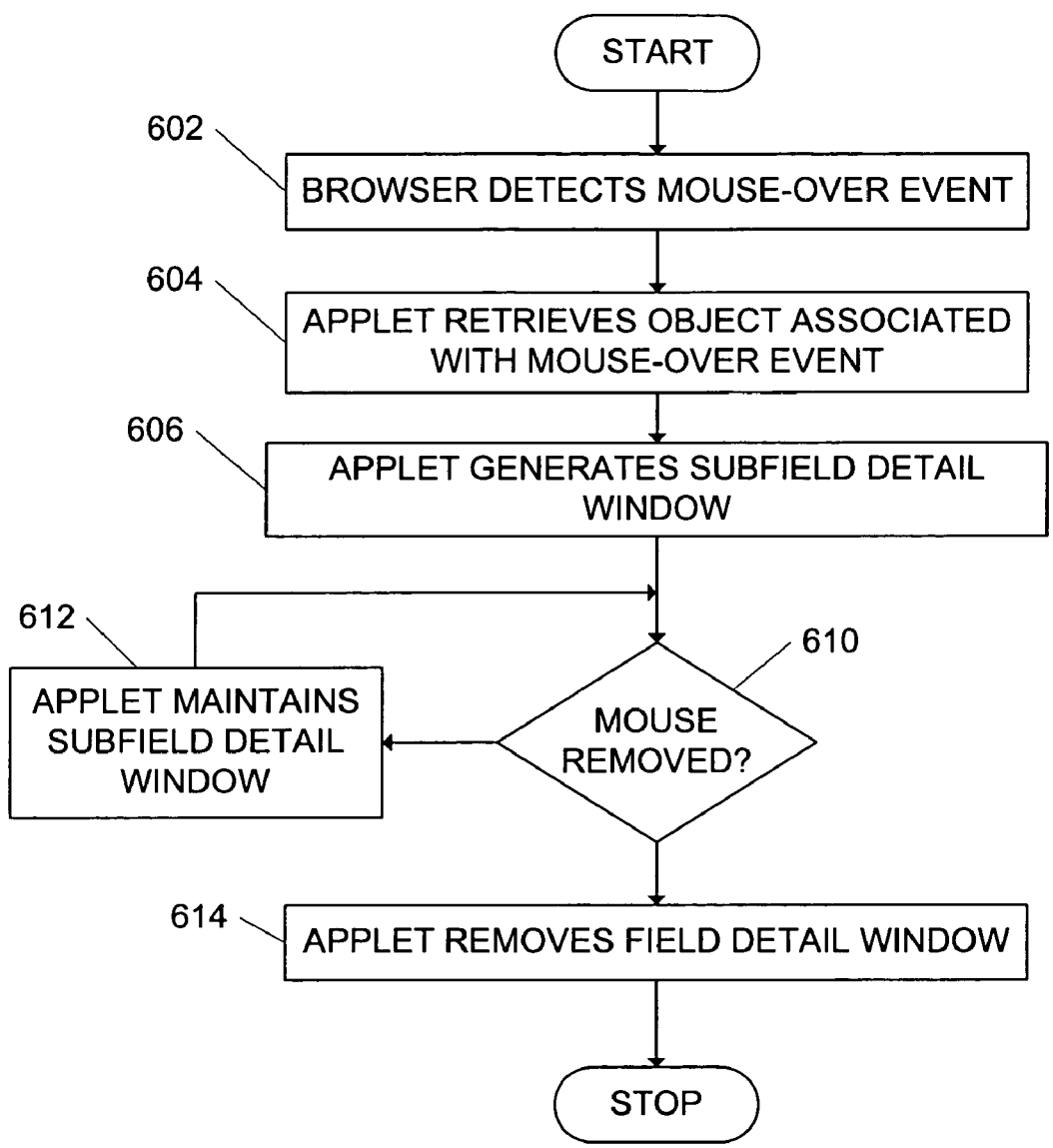
FIG. 6 is a flow diagram that illustrates the processing steps executed by the computer system of FIG. 1 to generate a mouse over detail window in response to user interaction with the product review page display.
Figure 7:
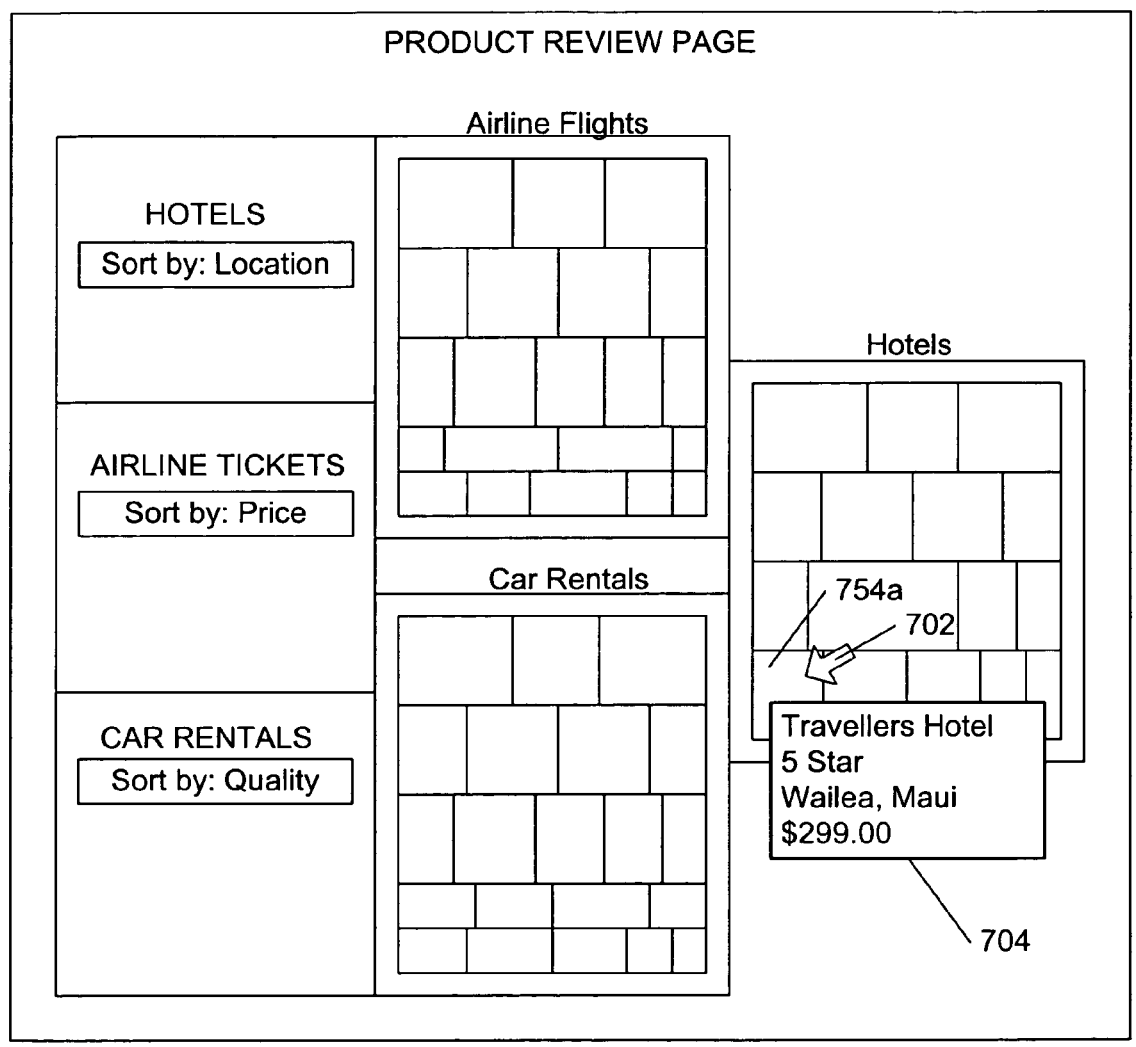
FIG. 7 is an illustration of a display screen produced by the computer processing system illustrated in FIG. 1 at a client node, showing a product review page display and a mouse over detail window.

FIG. 6 is a flow diagram that illustrates the computer operations by which the user may interact with the product review page to obtain information regarding the data represented in the tree map. The steps are implemented as computer program instructions stored in the client computer node 102. In the first operation, represented by the flow diagram box numbered 602, the browser program 105 detects that a display cursor 702 has moved over a subfield area 754a of the product review page, as shown in the display representation of FIG. 7. This is referred to as a "mouse-over event." The browser program 105 passes the mouse-over event to the applet program 110 for appropriate action.

In the next operation, represented by flow diagram box 604, the applet program 110 retrieves a mouse-over object that is associated with the subfield area 754a. The mouse-over object preferably includes information regarding the associated data element for the subfield area 754a, including the magnitudes of the dimensions for the data element. For example, if subfield area 754a relates to a "hotel room" data element, the mouse over data object preferably contains data regarding the dimensions for the hotel data element, such as the name of the hotel, the price of the hotel, the location of the hotel, and the quality rating for the hotel. The information contained in the data object could vary widely depending on the specific item or product that is associated with the data element.

The mouse-over object preferably also includes instructions for drawing a mouse-over subfield detail window 704 (FIG. 7) for the subfield area 754a. In the operation represented by flow diagram box 606, the applet program 110 causes the subfield detail window 704 to appear on the product review page, preferably immediately adjacent to the subfield area 754a. Preferably, the subfield detail window 704 includes information regarding one or more of the dimensions for the data element associated with the subfield area 754a. If the data element relates to a product, the subfield detail window 704 includes information related to that product. For example, in the context of a "hotel room" data element, the subfield detail window 704 displays the name of the hotel, the star rating of the hotel, the location of the hotel, the price of the hotel, and so forth. Thus, the user can easily obtain more detailed information regarding the product associated with any subfield area by simply moving a display cursor over the subfield area.

The browser program 105 preferably detects whether the display cursor 702 has been removed from a location over the subfield area 754a, as represented by flow decision box 610. The applet program 110 preferably maintains the subfield detail window 704 in display as long as the display cursor remains over the subfield area 754a, as represented by flow diagram box 612. If the browser program detects that the display cursor 702 has been moved outside of the boundaries of the subfield area 754a, the applet program 110 removes the subfield detail window 704 from display (flow diagram box 614) and the process ends.

Figure 8:
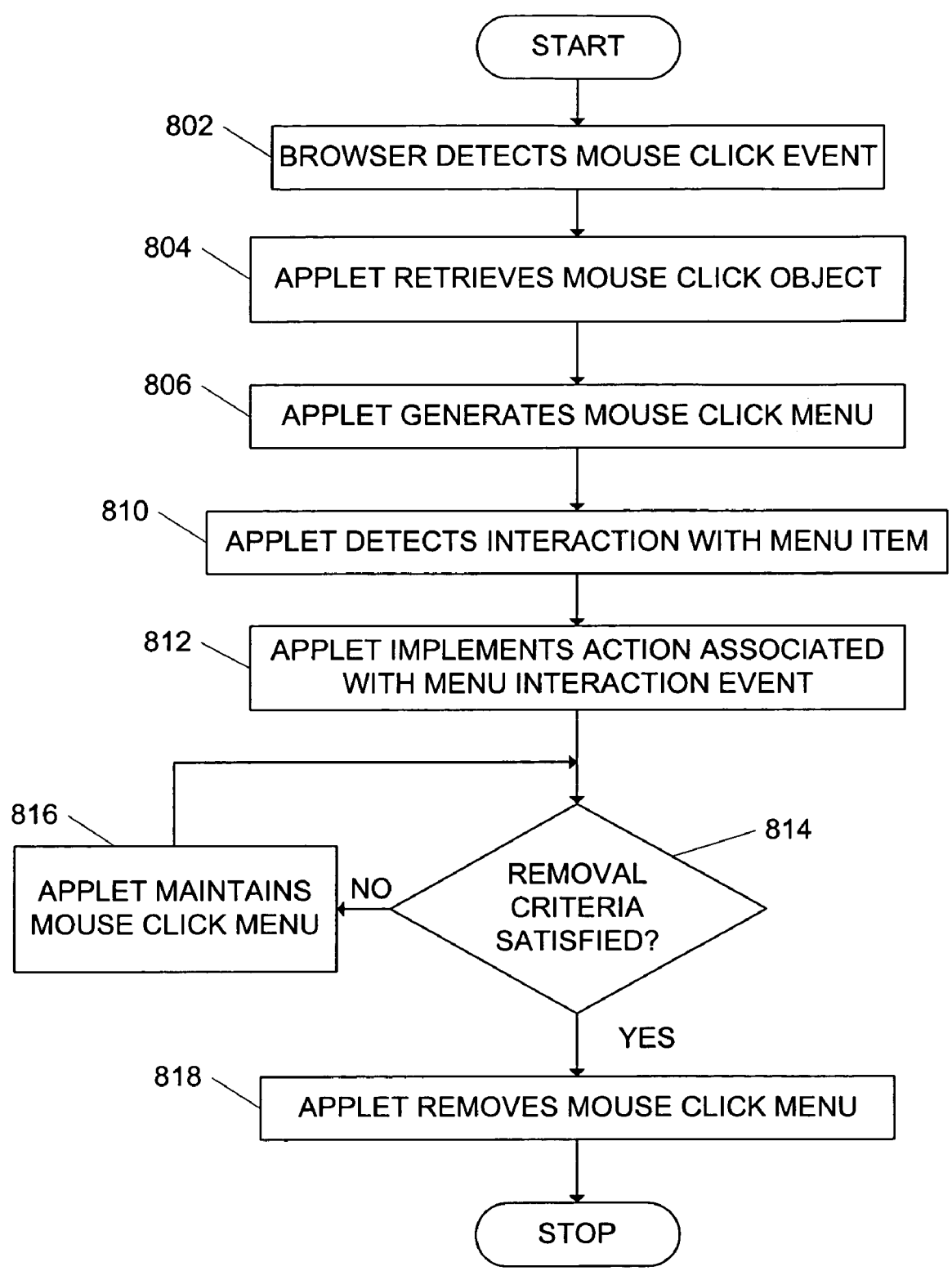
FIG. 8 is a flow diagram that illustrates the processing steps executed by the computer system of FIG. 1 to generate a mouse click menu window in response to user interaction with the product review page display.

FIG. 8 is a flow diagram that illustrates the operating steps by which the user may obtain additional information regarding the products represented by the field areas of the product review page. The steps are implemented as computer program steps stored in the client computer node 102. In the first operation, represented by flow diagram box 802, the browser program 105 detects that a display cursor 902 has moved over a subfield area 954a of the product review page and that a mouse click has been performed on the subfield area 954a. This is referred to as a "mouse click event." The browser program 105 then passes the mouse click event to the applet program 110 for processing.

In the next operation, represented by flow diagram box 804, the applet program 110 retrieves a mouse click object that is associated with the subfield area 954a. The mouse click object preferably includes information regarding the product represented by the subfield area 954a, such as all or some of the information contained in the mouse-over object described above. The mouse click object also includes additional information, such as one or more URLs for Web sites that are related to the product offering represented by the subfield area 954a.

Figure 9:
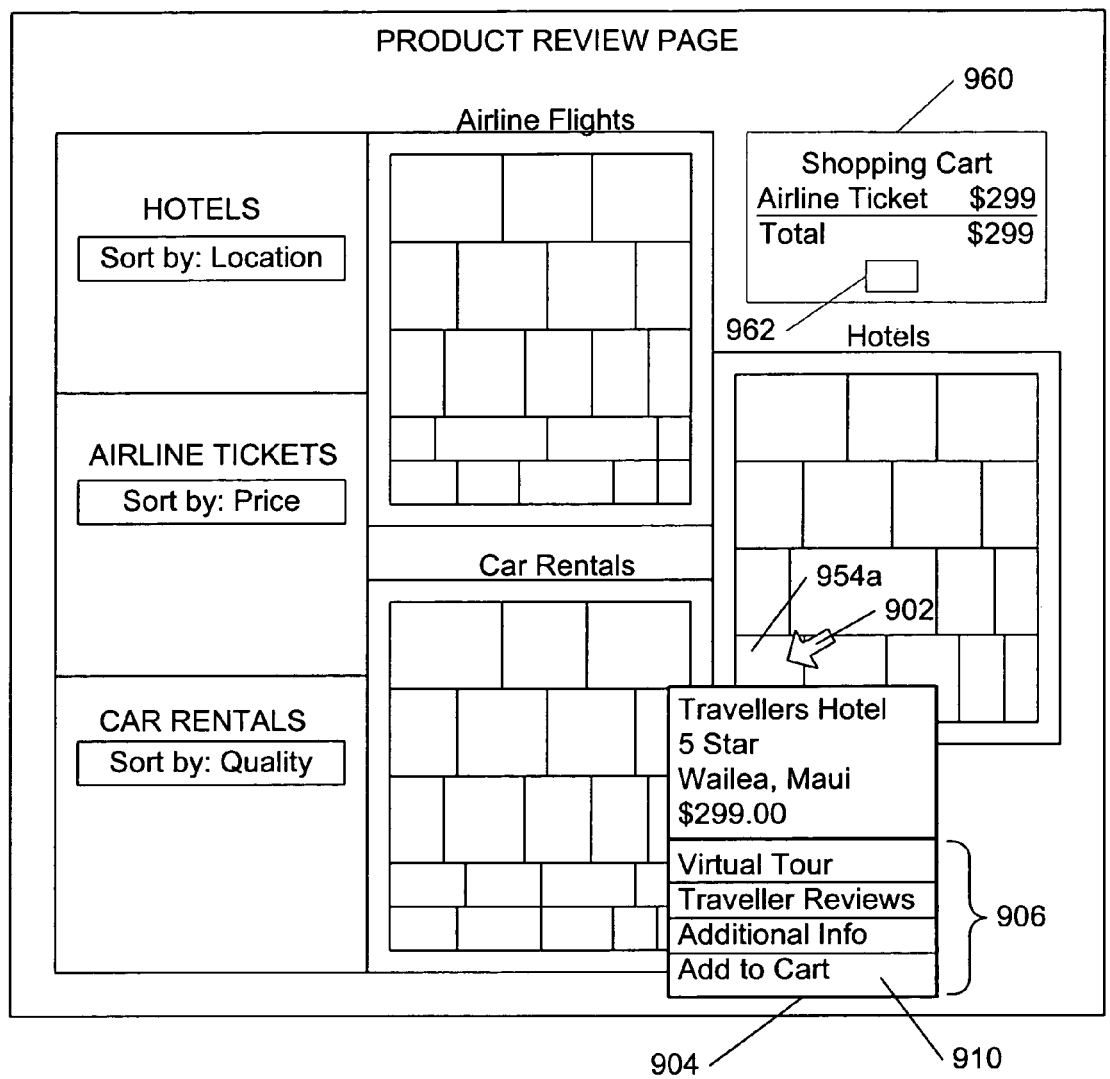
FIG. 9 is an illustration of a display screen produced by the computer processing system illustrated in FIG. 1 at a client node, showing a product review page display and a mouse click menu window.

The mouse click object preferably also includes instructions for drawing a mouse click subfield menu window 904 (FIG. 9) for the subfield area 954a. In the operation represented by flow diagram box 806 (FIG. 8), the applet program 110 causes the mouse click subfield menu window 904 to appear on the product review page. With reference to FIG. 9, the mouse click subfield menu window 904 preferably includes some or all of the information from the mouse over field detail window. The subfield menu window 904 also includes one or more menu items that allow the user to initiate certain actions that relate to the product.

The mouse click subfield menu window 904 preferably includes one or more hyperlinks 906 that, when selected by the user, will cause the browser program to access an object or Web page that is related to the product offering represented by the subfield area 954a. At least some of the Web pages are preferably selected to steer the user toward a purchase of the product offering. For example, if the product offering is a hotel room, the hyperlinks could connect to virtual tours of the room or to traveler reviews of the rooms. The hyperlinks 906 could also be pointed to informational objects or Web sites that provide additional information on the product offering or information related to similar or ancillary products. The hyperlinks 906 could also allow the user to open a suggested product area, such as was described above with respect to FIG. 3C. In this way, the consumer could be guided to other products that may be of interest but had not yet been considered.

The mouse click subfield detail window 954a preferably also includes an "add to shopping cart" menu item 910. This menu item allows a user to add the product represented by the subfield area 954a into a selection box, such as, for example, a virtual shopping cart. The shopping cart is an electronic basket of products that the user desires to purchase. The user adds the product to the shopping cart by selecting the "add to shopping cart" menu item 910, such as by performing a mouse click on the menu item. In an alternative embodiment, a second Web page is used for adding items to the shopping cart.

The product review page preferably includes a shopping cart box 960 that provides a visual indication or tally of which products, if any, have been added to the shopping cart. The shopping cart box 960 preferably includes a listing of the product name and a tabulation of each product price as well as the total price for all products in the shopping cart. The shopping cart box 960 preferably also includes a checkout button 962 that the user can select to initiate a purchase transaction for the products in the shopping cart. It will be appreciated that the shopping cart box 960 could also be located on a separate Web page.

In the next operation (flow diagram box 810), the browser program 105 detects that the user has interacted with one of the menu items on the subfield menu window 904. This is referred to as a menu interaction event. In the operation represented by flow diagram box 812, the browser program 105 and/or the applet program 110 then initiates an action that is associated with the selected menu item. If the menu item is a hyperlink, then the browser program 105 issues an HTTP request for the web page that is associated with the hyperlink.

If the user selected the "add to shopping cart" menu item 910, the applet program 110 adds the product to the user's shopping cart and updates the shopping cart box 960 to reflect the change. The user is preferably able to initiate a purchase transaction for the items in the shopping cart by performing a single action, such as by clicking on the checkout button 962.

In the next operation, represented by the decision box 814, the applet program 110 determines whether the criteria for removal of the subfield menu window has been satisfied. The removal criteria could vary, but preferably includes the user pressing an "escape" key or the user clicking the mouse on an area of the display that is located outside of the subfield menu window 910. The subfield menu window 910 remains on the window if the removal criteria is not satisfied, as shown in flow diagram box 816. The applet program 110 removes the subfield display window 910 once the removal criteria is satisfied, as shown in flow diagram box 820. The process then ends.

Thus, from the same product review page, the user can review various types of product information by scrolling the display cursor over the subfield areas of the product review page and/or clicking on specific subfield areas that represent the products. Advantageously, the user can review product information, compare information for various products, and insert one or more products into a shopping cart using a single product review page screen. The user is not required to scroll between different displays or move between separate web sites in order to perform these tasks.

Generation of the Product Review Page

After the computer system has identified a subset of data elements that meet the specified criteria, the applet program draws field areas and subfield areas that are associated with the subset of data elements. The applet program preferably draws square-like subfield areas that each have an aspect ratio (ratio of length to width) that is close to a one value.

The applet program has an available amount of screen display area that will be filled with field areas and subfield areas. The amount of available area is preferably arbitrarily assigned and is limited by the size of the viewable region on the computer display device upon which the tree map is displayed. The available area and the size of the field areas and subfield areas may be measured in any unit, such as, for example, in pixels.

Figure 10:
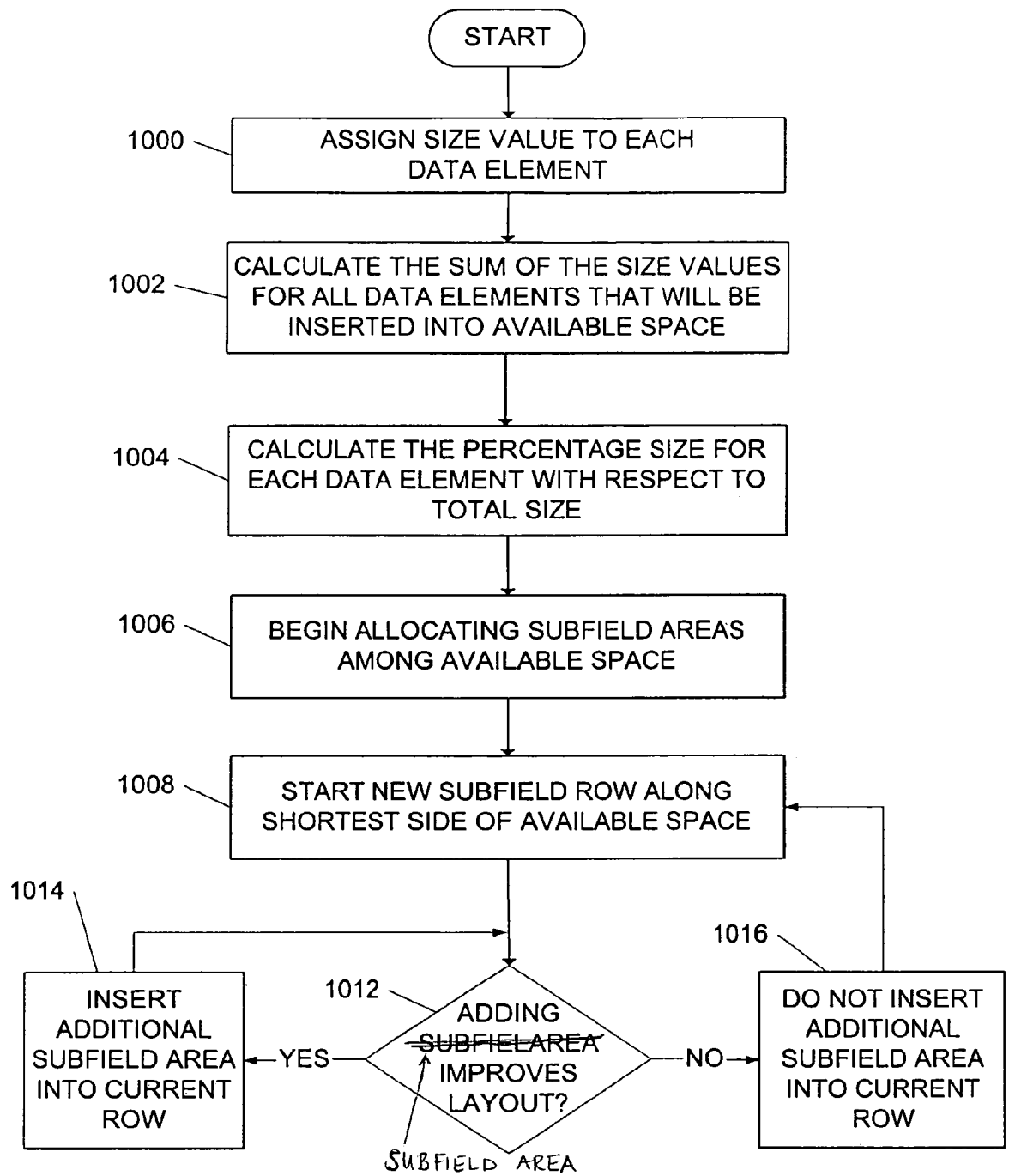
FIG. 10 is a flow diagram that illustrates the processing steps executed by the computer system of FIG. 1 to draw field areas of a product review page display.

FIG. 10 is a flow diagram that illustrates the operating steps by which the applet program allocates the available area among the identified subfield areas that meet the specified criteria. The flow diagram also describes the processing steps by which the applet program positions the subfield areas within a field area having a given two-dimensional size.

In a first operation, represented by the flow diagram box numbered 1000, the applet program assigns a size value to each data element subfield area based upon the value of the dimension that is represented by the data element. The size value is preferably set equal to or proportional to the value of the represented dimension. For example, if the size of the subfield area is representative of the price, then the size value will be equal to the magnitude of the price dimension of the data element.

In the operation step represented by the flow diagram box numbered 1002, the applet program calculates the sum of the size values for all of the data elements that will be inserted into the available space.

The next operation is represented by the flow diagram box numbered 1004. In this step, the applet program divides the previously-calculated sum by the size value for each of the data elements. The applet program has thus obtained a percentage value for each of the data elements. The percentage value represents the percentage of available space that a data element's associated subfield area will consume.

Figure 11A:
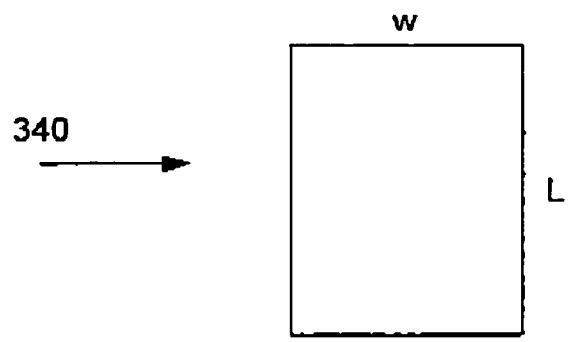
FIGS. 11A-11D graphically illustrate the steps of allocating available screen space to rows of field areas during generation of a product review page display.

The applet program next starts to recursively allocate the available area among the rectangular subfield areas, as represented by the flow diagram box numbered 1006. FIG. 11A shows an exemplary rectangle that represents the amount of available area. The rectangle has a length L and a width W.

Figure 11B:
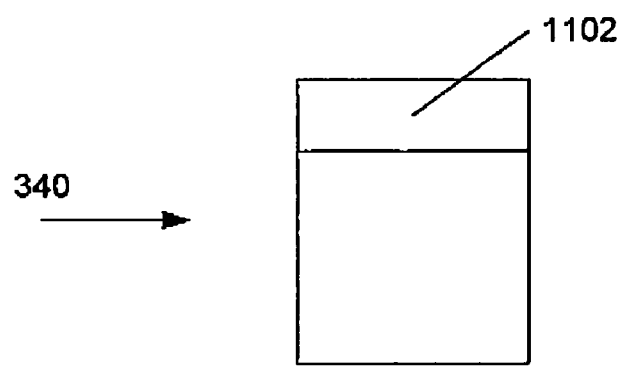

In the next operation, represented by the flow diagram box numbered 1008, the applet program starts a new subfield row by inserting a subfield area 1102 along one side, preferably the shortest side, of the available area. This is illustrated in FIG. 11B, where a subfield area 1102 is shown inserted along the shortest side of the available area. The applet program preferably inserts subfield areas in order according to the size of the subfield area, such as from largest to smallest. As mentioned, the size of the subfield area is calculated as a percentage of the available area. For example, assume that the subfield area 1102 has an area size of 6 units.

In the next operation step, represented by flow decision box 1012, the applet program determines whether inserting an additional subfield area into the current row will improve the layout of the subfield areas in that row. The layout is considered improved if, by adding a new subfield area, the aspect ratio of the subfield areas in the row are moved closer to a value of one and thereby become more "square." For example, in FIG. 11C, a subfield area 1104 having an area size of 6 units has been added to the row. The layout of the row has improved, as the subfield area 1102 has become more "square" by the addition of the subfield area 1104.

If the layout of the row will indeed be improved by adding a subfield area to the row, then the applet program proceeds to insert an additional subfield area into the current row. This is represented by flow diagram box 1014. The applet program will then determine again whether to insert an additional subfield area into the current row.

Figure 11C:
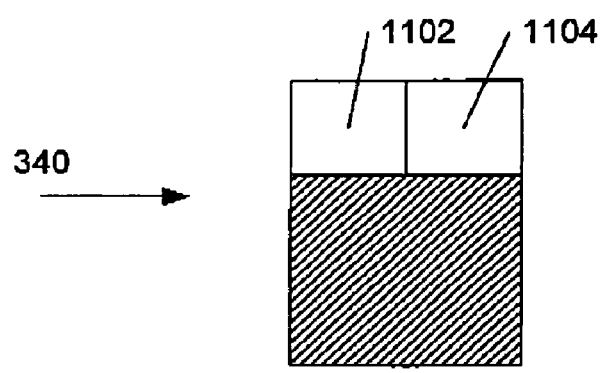
Figure 11D:
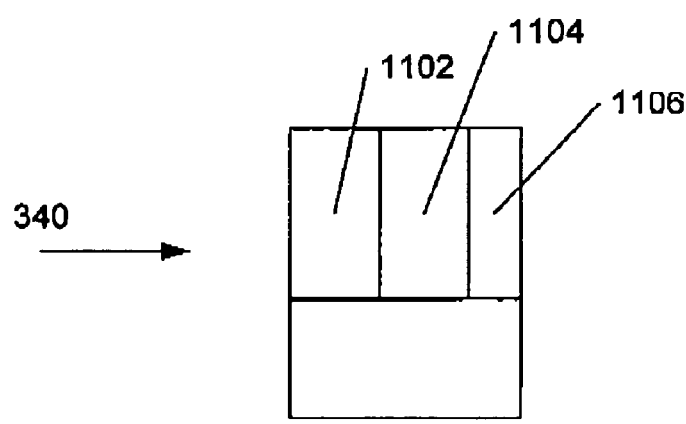

If inserting an additional subfield area to the current row will not improve the layout of the row, then the applet fixes the layout of the current row by not inserting an additional subfield area into the row. This is represented by flow diagram box 1016. For example, FIG. 11D shows the results of inserting an additional subfield area 1106 into the row. The subfield area 1106 has a size of 4 units. As shown, the insertion of the new subfield area 1106 into the row causes subfield areas 1102 and 1104 to become more thin and elongated with respect to the previous layout shown in FIG. 11C. Thus, the addition of a new subfield area to the row did not improve the layout of the subfield areas in the row. Therefore, the applet will not add the new subfield area 1106 to the row, but will have the areas 1102 and 1104 as the only areas in the first row (FIG. 1C).

After the applet program has fixed the layout of a row, the applet program returns to operation 1008 and starts to form a new subfield row. The amount of available space is reduced by the amount of space consumed by the subfield areas in the previous row. This is illustrated in FIG. 11C, where the amount of available space is indicated with shading. The applet program recursively inserts rows of subfield areas into the available space and adjusts the available space according to the aforementioned process until all of the data elements have been represented by subfield areas.

Advantageously, the aforementioned process results in subfield areas that are as square-like as possible, as the applet program avoids drawing subfield areas that are thin, and elongated. Square-like subfield areas are preferred because square field areas are more easy to identify for a user than thin, elongated subfield areas. Additionally, it is easier for a user to use a display cursor to point at square-like subfield areas. The user can also more easily compare the relative sizes of rectangles that have similar aspect ratios.

Figure 12:
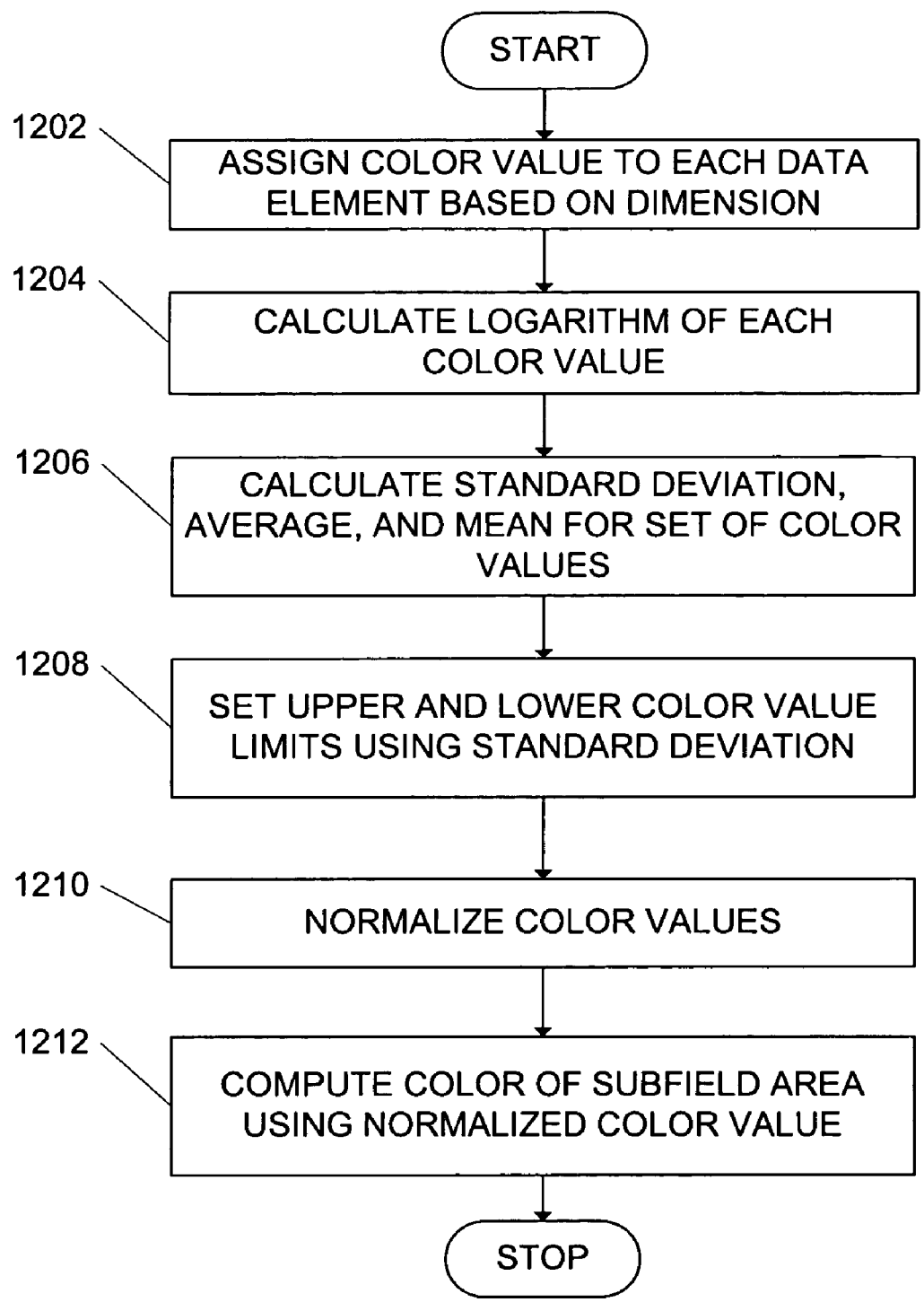
FIG. 12 is a flow diagram that illustrates the processing steps executed by the computer system of FIG. 1 to assign screen colors to field areas of a product review page display.

As discussed above, the screen color of each subfield area represents the value of a dimension for the associated data element. The applet program preferably assigns each data element with a color value or range of color values wherein the color value is indicative of the value of the represented dimension. For the subfield areas within a common field area, the applet program preferably selects a range of colors that avoids extreme differences in color. FIG. 12 is a flow diagram that illustrates the operating steps by which the applet program assigns screen colors to the subfield areas.

In the first operation step, represented by flow diagram box 1202, the applet program assigns a color value to each subfield area based upon the value of the dimension that is represented by the color. The color value is preferably equal to or proportional to the value of the represented dimension. In the next operation (flow diagram box 1204), the applet program calculates the logarithm of the color value of each of the subfield areas. The use of a logarithmic value reduces the numerical span for the range of values by eliminating excessively high or low values that may throw off subsequent statistical analyses that occur later in the process.

In the next operation, represented by flow diagram box 1206, the applet program calculates the standard deviation from a mean value of the set of color values of the subfield areas. The applet program also determines the average color value.

In the next operation, the applet program sets upper and lower limits for the range of color values. This is represented by flow diagram box 1208. The upper and lower limits may be arbitrarily set. In a preferred embodiment, the upper and lower limits are set as two standard deviations away from the mean color value.

The applet program next normalizes the color values to a value between 1 and zero, where a value of zero corresponds to the aforementioned lower limit and a value of one corresponds to the aforementioned upper limit. This operation is represented by flow diagram box 1210. The applet program then computes the screen color of each of the subfield areas using the normalized color values. The applet program then draws the product review page using the sizes and colors that were obtained from the operations described in FIGS. 10 and 12. The aforementioned process results in subfield areas that have easily identifiable color differences without an extreme amount of variance in color.

Figure 13:
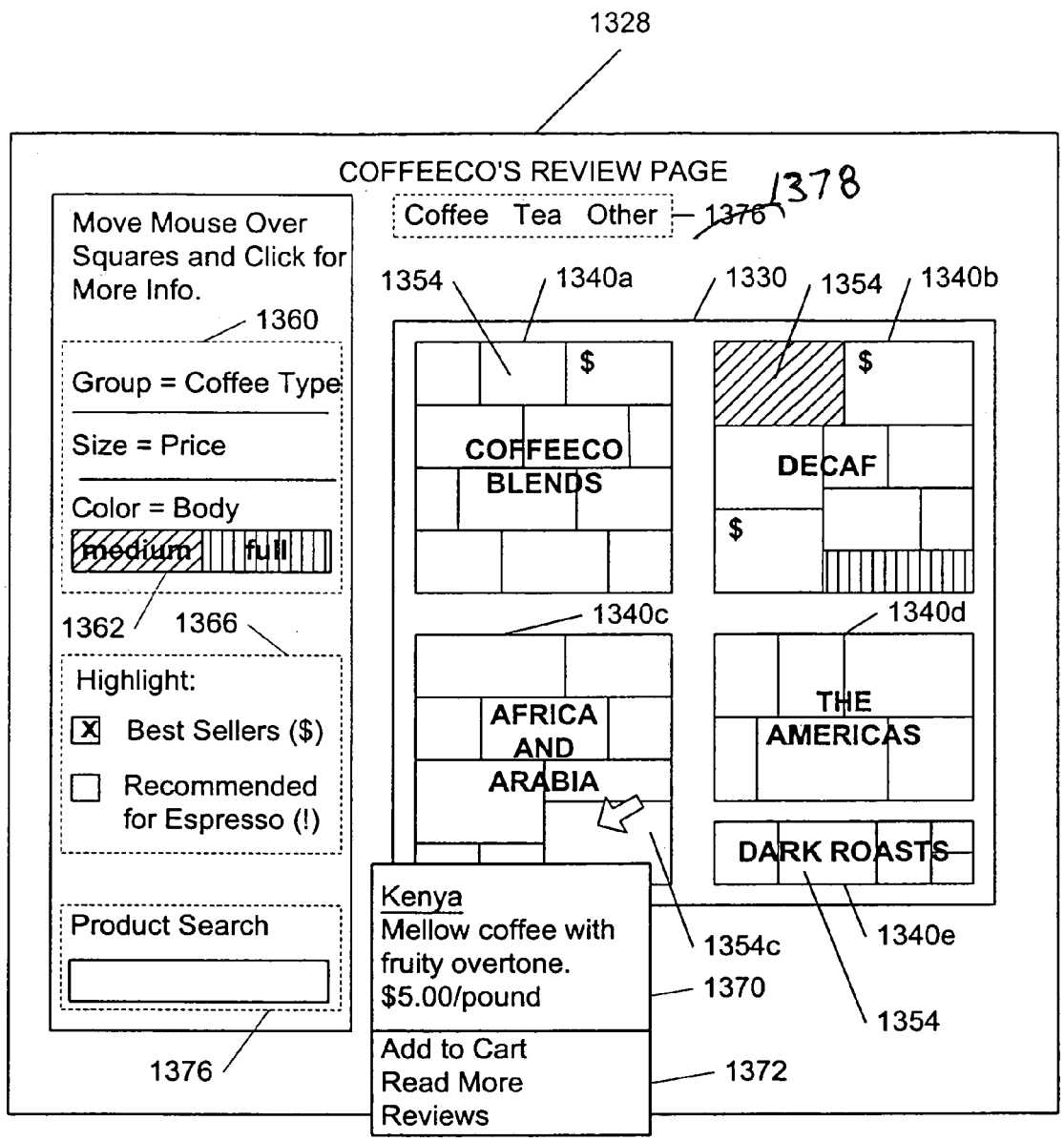
FIG. 13 is an illustration of a display screen produced by the computer processing system illustrated in FIG. 1 at a client node, showing a detailed view of another embodiment of the product review page display that is included in the browser window of FIG. 3A.

FIG. 13 is an illustration of a product review page 1328 that may be included in the active area 304 of the browser window of FIG. 3A. In this embodiment, the product review page 1328 is configured to display information regarding coffee-related products for an imaginary coffee product vendor named Coffeeco. The product review page 1328 includes a field array 1330 comprised of field areas 1340*a*, 1340*b*, 1340*c*, 1340*d*, and 1340*e*. Each field area 1340 represents a grouping of coffee products with each product being represented by a subfield area 1354.

The product review page 1328 includes a legend area 1360 that provides explanatory information regarding the significance of the attributes for the field areas 1340 and subfield areas 1354. For example, the legend area 1360 includes the text "Group=Coffee Type" which explains that the subfield areas 1354 are grouped according to coffee type. Specifically, the field area 1340*a* contains a grouping of subfield areas 1354 associated with "Coffeeco Blends" coffee products, the field area 1340*b* contains a grouping of subfield areas 1354 associated with "Decaf" coffee products, the field area 1340*c* contains a grouping of subfield areas 1354 associated with "Africa and Arabia" coffee products, the field area 1340*d* contains a grouping of subfield areas 1354 associated with "the Americas" coffee products, and the field area 1340*e* contains a grouping of subfield areas 1354 associated with "Dark Roasts" coffee products. Thus, for example, the subfield areas 1354 contained within the field area 1340*e* represent coffee products that are of the dark roast coffee type, the subfield areas 1354 contained within the field area 1340*b* represent coffee products that are decaf (i.e., decaffeinated) coffees, and so forth. Preferably, each field area 1340 has a title that describes the corresponding grouping for the field area 1340. In the illustrated embodiment, the title is superimposed over each field area 1340.

Figure 14:
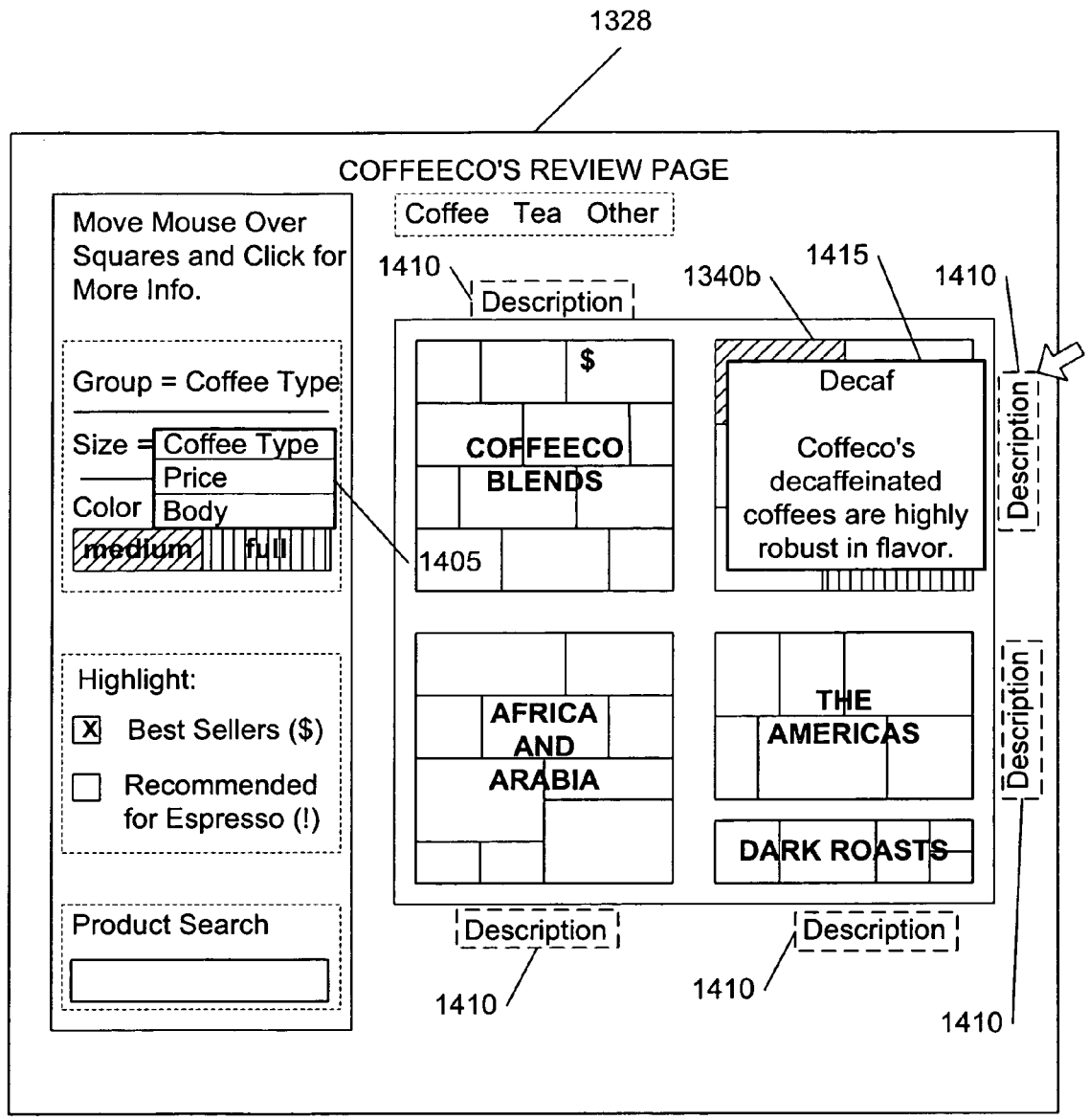
FIG. 14 is an illustration of a display screen produced by the computer processing system illustrated in FIG. 1 at a client node, showing another detailed view of the embodiment of the product review page display shown in FIG. 13.

The title could comprises a hyperlink that links to a window or separate Web page that includes descriptive information regarding the corresponding field area 1340. Alternately, each field area 1340 could have an associated hyperlink 1410 (FIG. 14) that links to a window 1415 or Web page that includes descriptive information regarding the associated field area 1340. Each hyperlink 1410 preferably includes anchor text that indicates the purpose of the hyperlink 1410. FIG. 14 shows an exemplary window 1415 that is displayed in response to the user selecting the hyperlink 1410 associated with the field area 1340*b*.

With reference again to FIG. 13, the legend area 1360 also includes the text "Size=Price" which explains that the size of each subfield area 1354 represents the purchase price of the corresponding coffee product represented by the subfield area 1354. Subfield areas 1354 of larger size have a higher purchase price than subfield areas of smaller size. The user can easily ascertain the relative prices of the coffee products represented by the subfield areas 1354 by examining the relative sizes of the subfield areas 1354.

The legend area 1360 further includes text that states "Color=Body" which explains that the color of each subfield area 1354 is an indication of the body of the associated coffee product, as mapped to a reference bar 1362. In FIG. 13, colors are represented by either a diagonal hatch pattern or a vertical hatch pattern fill area. As shown by the reference bar 1362, subfield areas 1354 that are filled with a diagonal hatch represent coffee products that have a medium body. Subfield areas 1354 that are filled with a vertical hatch represent coffee products that have a full body. For clarity of illustration, only two of the subfield areas 1354 have been filled with a hatch. However, preferably all of the subfield areas 1354 have associated colors or patterns that map to the color reference bar 1362. Furthermore, although the exemplary reference bar 1362 includes only two distinct bodies (medium and full) represented by two distinct colors, the reference bar 1362 and subfield areas 1354 preferably include a gradual range of variances in one or more colors to indicate finer variances in the body of the coffee products over a continuous spectrum.

Preferably, the user can reconfigure the legend area 1360 so that the subfield area attributes are associated with product characteristics that are selected by the user. The legend area 1360 could include one or more drop down menus that allow the user to reconfigure the product review page so that the subfield area attributes are associated with different product characteristics. For example, as shown in FIG. 14, a drop down menu 1405 allows the user to select which product characteristic, such as price, body, or coffee type, that is associated with the size of the subfields 1354. The product review page 1328 is reconfigured based upon the selection of the user. Preferably, similar drop down menus are provided for groupings and color and for any other subfield area attribute. Moreover, the user can preferably also select which color or colors will be used on the color reference bar 1362. In this manner, the user can select a preferred color scheme.

With reference to FIG. 13, the product review page 1328 also includes a highlight box 1366 that provides the ability to highlight all subfield areas 1354 that meet specified criteria. The highlight box 1366 includes two highlight criteria: (1) "Best Sellers" which is associated with a "$" symbol, and (2) "Recommended for Espresso" which is associated with a "!" symbol. When a highlight criteria is activated, such as by clicking on the criteria using a display cursor, then all subfield areas 1354 that meet the criteria are highlighted with the associated symbol. For example, the "Best Sellers" criteria is activated, as exhibited by the "X" in the box adjacent to the criteria. Consequently, several of the subfield areas 1354 are highlighted with a "$" symbol, indicating that the highlighted subfield areas 1354 represent coffee products that are best sellers. If the "Recommended for Espresso" criteria were to be activated, then all subfield areas 1354 that represent coffee products that are recommended for espresso would be highlighted with the "!" symbol. The highlight criteria may be varied.

The product review page 1328 includes a mouse-over subfield detail window 1370 that appears in response to a mouse cursor being moved over a subfield area 1354c, as described above with reference to FIGS. 6 and 7. The mouse-over subfield detail window 1370 includes information related to the coffee product associated with the subfield area 1354c, such as, for example, the name of the coffee and a description of the flavor.

A mouse click on the subfield area 1354c causes a mouse-click subfield menu window 1372 to appear, as described above with reference to FIGS. 8 and 9. The subfield menu window 1372 preferably includes items such as hyperlinks that link to additional information or to reviews of the corresponding product. The menu window 1372 preferably also includes an item that allows the user to add the associated product to a virtual shopping cart of the type known to those of skill in the art.

The product review page also includes a product search box 1376. The user can enter search strings into the product search box 1376 and then initiate a search of the database for particular products that are associated with the data string. When the search is complete, the product review page 1328 preferably displays information related to the product(s) that were found in the search.

The product review page could also include one or more hyperlinks 1378 that are linked to additional product review pages that are directed toward other products.

The display system as described above thereby permits a user to have control over the data displayed as a result of a user query. Advantageously, the tree map display format allows the data to be presented to a user in a single display screen. The user can identify and compare various aspects relating to data elements without having to scroll between multiple screens. The user can than select data elements that meet the user's requirements and initiate a purchase transaction with minimal effort.

The present invention has been described above in terms of a presently preferred embodiment so that an understanding of the present invention can be conveyed. There are, however, many configurations for data display systems not specifically described herein but with which the present invention is applicable. The present invention should therefore not be seen as limited to the particular embodiments described herein, but rather, it should be understood that the present invention has wide applicability with respect to data display generally. All modifications, variations, or equivalent arrangements and implementations that are within the scope of the attached claims should therefore be considered within the scope of the invention.

We claim:

1. A method of processing user criteria to retrieve a portion of data and display it to the user, the method comprising the steps of:

issuing a request for an application program, over a network communication session, from a client computer to a server computer, the application program being a server applet;

returning a datafile containing the application program from the server computer to the client computer;

initiating execution of the application program on the client computer;

communicating data criteria, specified by the user, from the application program to the server computer;

on the server computer, constructing one or more data objects that represent the data subset specified by the data criteria, and communicating the objects to the application program; and on the client computer via the application program, displaying the data subset in a display defined by a two-dimensional field array of information, wherein the field array of the display is divided into a plurality of two-dimensional bounded field areas, one or more of which has a display area that is indicative of a grouping criterion of the data subset, wherein the grouping criterion is user-selectable, and wherein the area of one or more bounded field areas is further divided into one or more subfield areas, one or more of which has an area that is indicative of a second data criterion of data subset, wherein the second data criterion is user-selectable;

wherein the one or more subfield areas are displayed with a color value via an algorithm comprising the steps of:

computing first color values for the one or more subfield areas, wherein the first color values are based on values of a dimension for associated data elements of the one or more subfield areas;

computing, for one or more of the first color values, second color values as logarithms of the first color values;

calculating mean and standard deviation of the second color values;

setting an upper and a lower limit for a set of final color values for the one or more subfield areas;

computing final color values by normalizing the second color values to numbers between zero and one, wherein zero corresponds to the lower limit and one corresponds to the upper limit; and assigning color values to the one or more subfield areas based on the final color values and displaying the assigned color values.

2. The method of claim 1, further comprising the steps of:

displaying a subfield detail window adjacent to or on top of one of the subfield areas in response to moving a display cursor over a boundary of the bounded subfield area to show data relating to the bounded subfield area;

removing the subfield detail window when the display cursor has been moved outside the boundaries of the bounded subfield area; and removing the subfield detail window when an escape key is pressed.

3. The method of claim 1, further comprising the step of:

providing a highlight box by which one or more subfield areas meeting one or more user-specified criteria are highlighted with one or more symbols associated with the criteria.

4. The method of claim 3, further comprising the step of:

providing a menu such that the grouping criterion is user-changeable, such that one or more subfield areas are grouped with one or more other subfield areas according to the changed grouping criterion.

5. The method of claim 1, wherein server applet runs in a virtual machine in a browser, wherein a reference tag to the server applet is embedded in a web page containing HTML code, such that the HTML code identifies the server applet to the browser and provides one or more parameters necessary for the browser to receive and launch the server applet.

6. The method of claim 5, wherein the virtual machine implements a browser-compatible language.

7. The method of claim 6, wherein the client computer is a hand-held computer.

8. A method of displaying a tree map, comprising the steps of:

computing first color values for one or more subfield areas of a tree map, wherein the first color values are based on values of a dimension for associated data elements of the subfield areas;

computing, for one or more of the first color values, second color values as logarithms of the first color values;

calculating mean and standard deviation of the second color values;

setting an upper and a lower limit for a set of final color values for the one or more subfield areas;

computing the final color values by normalizing the second color values to numbers between zero and one, wherein zero corresponds to the lower limit and one corresponds to the upper limit;

assigning color values to the one or more subfield areas based on the final color values; and displaying the assigned color values.

9. The method of claim 8, further comprising the steps of:

displaying a highlight box by which one or more subfield areas meeting one or more user-specified criteria are highlighted with one or more symbols associated with the criteria;

displaying a menu item by which the factors which govern the bounded field areas are changed, such that the subfield areas are regrouped according to user-specified criteria;

displaying a menu item by which the criteria used for displaying data elements are automatically widened and narrowed; and providing an aural attribute associated with one or more subfield areas for indicating, via sound, a dimension of the data element for the subfield areas.

10. The method of claim 9, wherein the upper limit is about two standard deviations above the mean, and the lower limit is about two standard deviations below the mean.

* * * * *